US006038494A

United States Patent [19]
Fisher, Jr. et al.

[11] Patent Number: 6,038,494
[45] Date of Patent: Mar. 14, 2000

[54] CONTROL SYSTEM FOR ENHANCING FISH SURVIVABILITY IN A HYDROELECTRIC POWER GENERATION INSTALLATION

[75] Inventors: Richard K. Fisher, Jr., Jacobus; Ronald E. Deitz, York, both of Pa.

[73] Assignee: Voith Hydro, Inc., York, Pa.

[21] Appl. No.: 08/859,686

[22] Filed: May 21, 1997

[51] Int. Cl.$^7$ ............................................. G06F 00/00
[52] U.S. Cl. ..................... 700/287; 119/219; 119/215; 119/220; 700/286; 700/289; 700/292; 700/295; 43/9.6; 43/43.1; 165/244
[58] Field of Search .................. 364/528.22, 528.21, 364/528.24, 528.27, 528.39; 165/244, 201; 60/60; 119/219, 215, 220; 43/9.6, 43.1

[56] References Cited

U.S. PATENT DOCUMENTS

| | | | |
|---|---|---|---|
| 4,319,320 | 3/1982 | Sato et al. | 364/165 |
| 4,683,718 | 8/1987 | Larsson | 60/327 |
| 4,823,018 | 4/1989 | Kuwabara et al. | 290/7 |
| 4,932,007 | 6/1990 | Suomala | 367/139 |
| 5,322,412 | 6/1994 | Erlach | 415/1 |
| 5,402,332 | 3/1995 | Kopf | 364/149 |
| 5,800,077 | 9/1998 | March | 405/80 |

FOREIGN PATENT DOCUMENTS

| | | |
|---|---|---|
| 0644331A1 | 3/1995 | European Pat. Off. . |
| 1228445 | 4/1971 | United Kingdom . |

OTHER PUBLICATIONS

English Translation of EP No. 0644331A1 Process for Optimizing the Efficiency of a Hydroturbine.

*Primary Examiner*—William Grant
*Assistant Examiner*—McDieunel Marc
*Attorney, Agent, or Firm*—Foley & Lardner

[57] ABSTRACT

A system for controlling a hydroelectric power production facility includes sensors for detecting the presence of fish adjacent to the facility. A controller linked to the sensors controls the orientation of control surfaces associated with a turbine/generator set to enhance the survivability of fish entrained into the facility when fish are detected to be present. The system may be adapted to control fish bypass and spillway structures within the facility to further enhance the survivability of fish populations. The system balances fish survivability with other parameters related to the operation of the facility, optimizing power production levels once estimates of fish survivability meet targets or optimum levels. The system may be adapted to coordinate control of several facilities along a water system to permit implementation of an overall water, fish and power management plan.

47 Claims, 12 Drawing Sheets

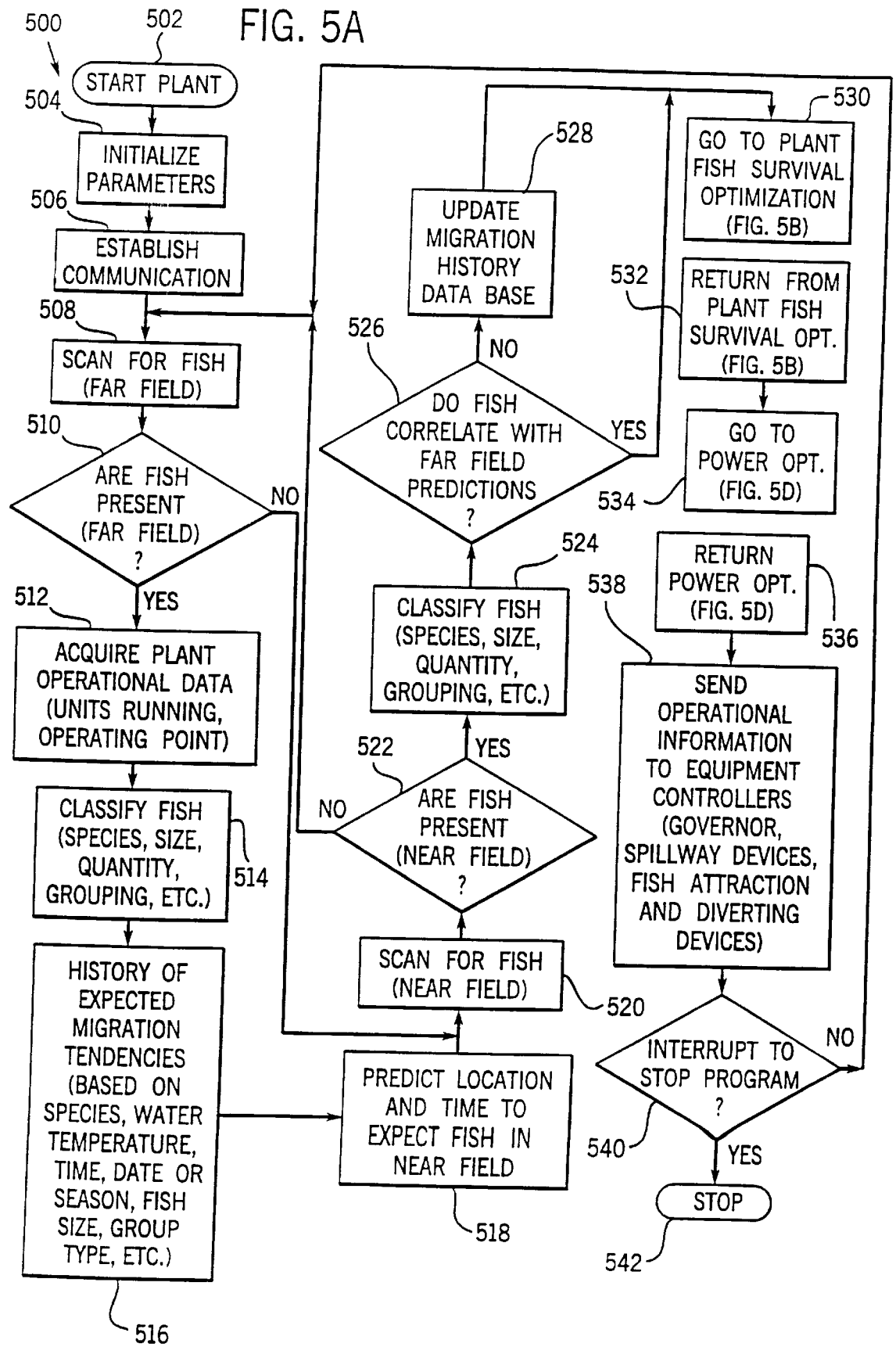

CONTROL SYSTEM FOR ENHANCING FISH SURVIVABILITY IN A HYDROELECTRIC POWER GENERATION INSTALLATION

FIELD OF THE INVENTION

The present invention relates generally to the field of control of hydroelectric power generation installations, such as dams and the like incorporating one or more power generating turbines and flow bypass structures. More particularly, the invention relates to the monitoring and control of such a facility to enhance the survivability of fish populations inhabiting the vicinity of the facility that may be entrained into and pass through the turbines and flow bypass structures. The invention also relates to the control of a power production system, such as a system incorporating several power generating installations, capable of enhancing fish survivability and accommodating an overall water management program, while optimizing power production levels in the overall system.

BACKGROUND OF THE INVENTION

Various techniques have been proposed for controlling and optimizing performance of turbine-power generating facilities, particularly facilities incorporating Kaplan turbines. Such techniques generally accommodate the influence of various operating parameters on turbine performance and may seek to optimize power production or efficiency of a turbine unit by properly adjusting the parameters, such as wicket gate and/or blade positions, known to influence turbine performance. The influence of the adjusted parameters on performance is typically known from past performance data, model testing, or empirical results of tests actually performed on specific turbine units. Such techniques allow the operation of turbine units to be manipulated so as to optimize their performance either automatically or by operator intervention.

Improvements in turbine optimization techniques have included systems for considering the influence of a large array of parameters on the performance of individual turbine units and the overall power production facility. In one such system, a multi-dimensional, or "N-dimensional" cam is developed, based on site information and measurement, including dimensions for various operating parameters such as head water elevation, tail water elevation, flow rate, power output level, location of a turbine unit in an installation, (e.g., across a stream) and operating data on neighboring turbines in an installation. The parameters form an N-dimensional array or matrix including cells corresponding to the various combinations of ranges for each parameter. Each matrix location is then populated with information indicative of the relationship between gate and/or blade positions and the various operating parameters of the turbine. Over time, the N-dimensional matrix is thus populated with optimal gate and blade settings for each combination of parameter ranges. Moreover, various approaches can be used for identifying the optimal gate and blade settings for each matrix location. Such approaches include the use of penalty functions assigned a value to each parameter such that the optimal gate and blade positions will be determined to minimize an overall cost function.

As improved control systems have become available for power-generating turbines, adding additional sophistication and potential for enhanced control of individual turbine units and installations, increasing emphasis has been placed on the impact of power-generating installations on the environment, including on wildlife. Specifically, improvements to the physical structure of turbine units have been proposed to enhance the statistical probability for survival of fish that pass through the units during operation. However, adjustments of controlled parameters to further enhance the statistical probability for fish survival has lagged significantly behind such developments. This tendency has probably been influenced by a perception that regions of optimal efficiency for operation of turbines generally correspond to regions of optimal fish survivability. While this may sometimes be the case, it appears that a more informed approach to control of turbine units should account for the influence of controlled parameters on both the power production level and efficiency, maintenance and fish survival predictions considered as separate, although interacting, influences on the system. Heretofore known control systems, however, have not been equipped to consider such factors and to subsequently control turbine settings based upon their combination. Moreover, even if modifications in turbine operation could be made to enhance fish survivability, known control systems are not equipped to account for the impact (e.g., economical, environmental) of such modifications in such a way as to adequately inform facility management.

Other drawbacks of existing control systems result from their limited control scope, both in terms of geography and controlled parameters. In particular, most known control systems typically operate on a single turbine unit or bank of turbine units. Although systems have been proposed for managing multiple dams, such systems generally take into account only revenue generating parameters, and not environmental impact variables. Consequently, such control systems are not well suited for implementation of system-level water, fish and power management and planning schemes. Moreover, because heretofore known control systems have concentrated on operation of the turbine units and associated power generation equipment, they are not well suited for altering other operating parameters, such as those relating to spillway and fish bypass structures, in an integrated approach for implementation of water and fish management schemes.

There is a need, therefore for an improved system for controlling operation of a power-generating turbine unit, installation, and system, wherein fish survivability is considered as a separate factor impacting the desired settings of controlled parameters, such as wicket gate and blade positions, as well as operation of spillway and fish bypass structures. There is also a need for a system which can provide both planning and monitoring functions, as well as real-time control of a turbine unit or installation based upon both long-range knowledge of fish behavior and upon immediate or short-range knowledge of fish location and movement.

SUMMARY OF THE INVENTION

The present invention features a novel monitoring and control system for power-generating turbine units, installations and systems, consisting of at least one turbine unit associated in certain cases with flow and fish bypass structures, designed to respond to these needs. The system is capable of monitoring fish location and movement via sensors positioned about the installation. In a preferred configuration, the sensors provide an indication of both fish location (position in a pond or stream and depth within the water) and, where properly instrumented, of fish type and school density. The information is used to monitor movement over time both in near and far fields relative to the installation. The information is collected and stored in a long-range database for future reference. Fish location data is also collected in a near field related to immediate location of fish within a relatively short distance surrounding the intake to a turbine unit. Information on the near field is used both to update and correct far field data and to impact, in a relatively immediate manner, operation of the turbine unit.

Data relating the statistical probability for fish survival through a turbine unit and bypass structures is preferably stored in an N-dimensional matrix along with other parameters for the turbine installation. Such data provides an indication of fish survival rates as a function of the position of control surfaces, such as blade and gate positions for Kaplan turbine units. In a preferred embodiment, such data is evaluated in real time to balance the operation of the turbine units with that of bypass structures to appropriately weigh the impact of fish survivability on operation of the turbine units. The control of the system is then preferably modified based upon changes in the near and far field data. For example, the penalty function for fish survivability reductions can be increased in a linear or non-linear way to more heavily weigh fish survivability when significant densities of fish are located at positions in the near field known to result in entrainment of significant quantities of fish into turbine units. Thus, near field data and fish survivability based upon such data are used to override other performance-influencing factors when fish entrainment into the unit is predicted as imminent.

The near and far field data are also used as a predictive and planning tool for operation of the turbine installation, with knowledge of fish movement and behavior over longer ranges of time, such as weeks, months, seasons and years. When implemented on a system or stream-wide level, the system permits adaptation of the operating point of turbine units as well as water and fish bypass structures to realize desired fish survivability targets while optimizing energy production levels to the degree possible given the fish survivability targets. Moreover, when the system predicts that the optimal or target levels of fish survivability have been achieved, remaining adjustability of the control surfaces (in a "fish survivability-confined" region) may be optimized to provide maximum power output or efficiency.

Thus, in accordance with a first aspect of the invention, a system is provided for enhancing fish survivability in a hydroelectric installation. The installation is of the type having at least one power generating unit, the unit being positioned across a body of water between an upstream water source and a downstream water discharge region. The unit includes a turbine supported for rotation in response to water flowing therethrough and a power generator operatively coupled to the turbine for generating electrical power through rotation of the turbine. The unit also includes control surfaces selectively orientable to control power generated by the unit. The system includes means for correlating at least one desired position of the control surfaces with enhanced fish survivability as fish pass through the turbine. Means is also provided for detecting fish presence in the water. Further means are included for placing the control surfaces in the at least one desired position upon detection of the presence of fish in the water.

In accordance with another aspect of the invention, an improved power generation group is provided. The group includes a plurality of hydroelectric facilities disposed along a body of water flowing from an upstream source and a downstream discharge region. At least one of the facilities has at least one power generation unit, each unit, in turn comprising a turbine generator set positioned in the body of water for generating electrical power through rotation with the turbine. Each unit further includes control surfaces selectively orientable to control power generated by the unit.

The improvement to the group includes a system having means for correlating at least one desired position of the control surfaces of a given turbine of the power generation group with enhanced fish survivability as fish pass through the given turbine. The system further includes means for detecting fish presence in the water, and means for placing the control surfaces of the given turbine in the at least one desired position upon detection of the presence of fish in the water.

The invention also provides an improved system for controlling a group of facilities of the type described above, and further controlling at least one bypass structure having second control surfaces for selectively diverting water carrying fish around at least one of the facilities. The improvement comprises a system having means for detecting fish presence in the water adjacent to the facilities, and means for regulating positions of the first and the second control surfaces to control passage of fish through or around at least one of the facilities based upon detection of fish presence. The bypass structure may permit fish to pass either from upstream of the facility to a downstream side (e.g., with the normal downstream flow of water), or from the downstream side to the upstream side (e.g., via a fish ladder or similar structure during spawning runs and the like).

In accordance with a further aspect of the invention, a system for controlling a hydroelectric turbine unit includes a plurality of sensors for detecting presence of fish in the upstream water source, a memory circuit, a control circuit and a cost monitoring circuit. The memory circuit stores a predetermined set of operating parameters corresponding to desired positions of control surfaces of the unit. The desired positions of the control surfaces are selected to enhance survivability of fish entrained into and passed through the unit. The control circuit is coupled to the sensors, to the memory circuit and to actuators for controlling orientation of control surfaces within the turbine unit. The control circuit receives fish presence signals from the sensors indicative of the presence of fish at predetermined locations in the upstream water source. The control circuit is operative to generate command signals and to apply the command signals to the actuators to orient the control surfaces based at least in part upon the desired positions and upon the fish presence signals. The cost monitoring circuit is configured to generate a performance value representative of operating performance of the unit and to compare first performance values for the unit during periods of time when the control surfaces are oriented based at least in part on the fish presence signals and on the desired positions with second performance values representative of operating performance for the unit if controlled without regard to fish presence signals or to the desired positions.

In accordance with still another aspect of the invention, a system for controlling a hydroelectric turbine power generating unit includes a plurality of sensors for detecting presence of fish in the upstream water source, a memory circuit and a control circuit. The memory circuit stores a predetermined set of operating parameters corresponding to desired positions of control surfaces of the unit, the desired positions of the control surfaces being selected to enhance survivability of fish entrained into and passed through the unit. The control circuit receives fish presence signals from the sensors indicative of the presence of fish at predetermined locations in the upstream water source. The control circuit is operative to generate command signals and to apply the command signals to actuators to orient the control surfaces in a normal operating mode when the fish presence signals do not indicate the presence of fish within a predetermined location with respect to the facility, and in an override mode when the fish presence signals indicate the presence of fish within a predetermined location with respect to the facility.

The invention further provides a system for controlling a hydroelectric turbine power generating unit including a plurality of sensors for detecting presence of fish in the upstream water source, a memory circuit and a control circuit. The control circuit receives fish presence signals from the sensors indicative of the presence and location of fish upstream of the unit. The control circuit is operative to correlate the fish presence signals with at least one other operating parameter of the unit and to store values representative of the fish presence signals and the at least one other operating parameter in the memory circuit. The correlations are then preferably used to control operation of the unit or to monitor the impact of its operation on fish survivability.

BRIEF DESCRIPTION OF THE DRAWING

The present invention will become more fully understood from the following detailed description, taken in conjunction with the accompanying drawings, wherein like reference numerals refer to like parts, in which:

FIGS. 5A–5E are a flow charts illustrating exemplary control logic for controlling a hydroelectric power facility and system in accordance with certain aspects of the invention.

DETAILED DESCRIPTION OF PREFERRED EMBODIMENTS

Figure 1:
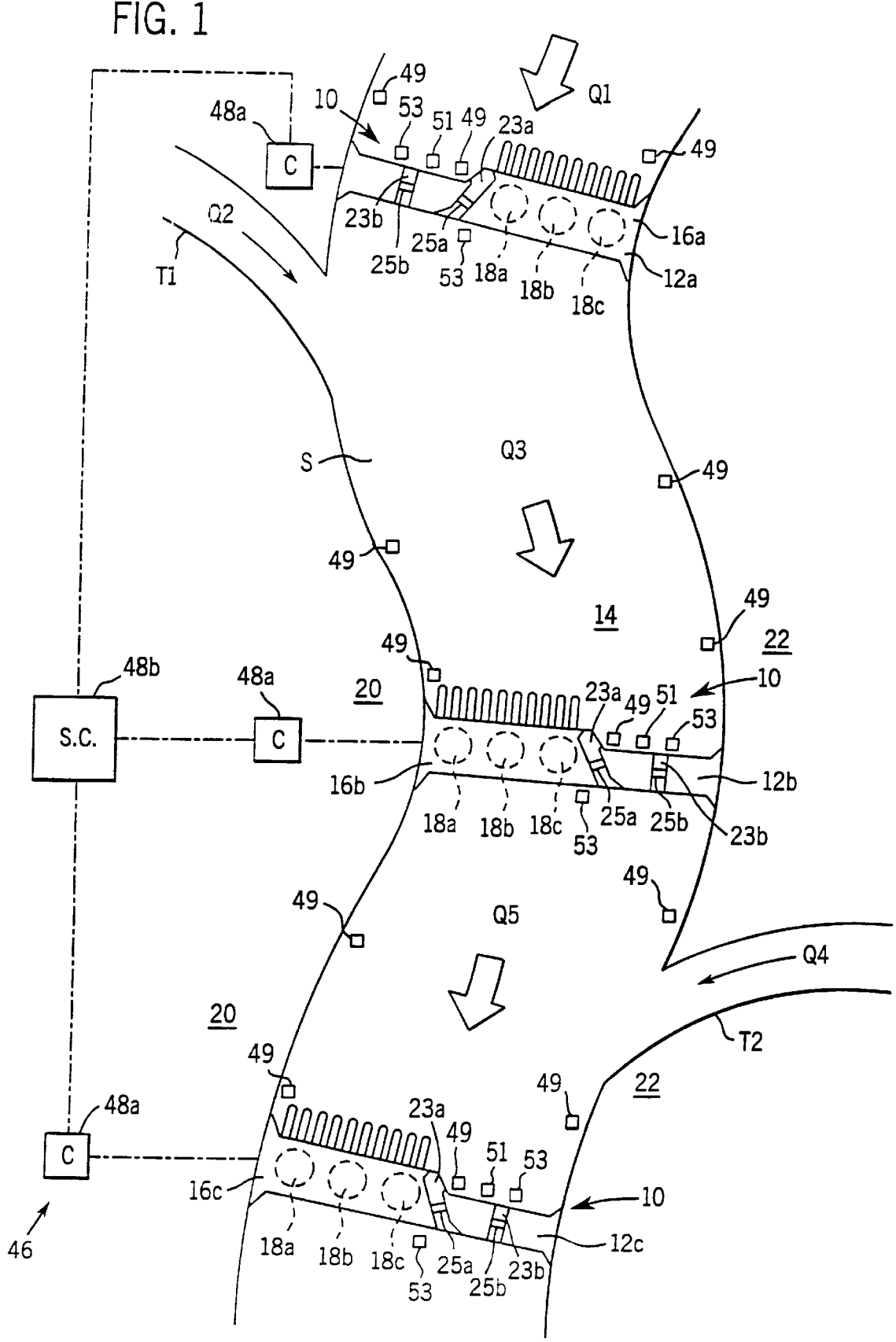
FIG. 1 is an exemplary perspective view of a turbine power generating system, including three hydroelectric facilities each having several turbine units disposed across a section of a stream and associated flow and fish bypass structures.

Turning now to the drawings and referring to FIG. 1, a hydroelectric power generating system is illustrated as including three installations 10, each including a dam 12 (or specifically 12a, 12b, 12c) spanning a stream 14, and a power generating facility 16 (or specifically 16a, 16b, 16c) extending across a portion of the dam. In the exemplary installation illustrated, each facility 16 includes a series of three turbine generating units, designated generally by the reference numeral 18 (or specifically by the numerals 18a, 18b and 18c). As will be understood by those skilled in the art, each facility 16 may include more or fewer generating units 18, and such units may be situated adjacent to one or both banks 20, 22 of stream 14, or at various locations between the banks. Moreover, in the embodiment illustrated in FIG. 1, each facility 16 includes fish and water management features including a fish bypass 23a and a spillway 23b, through which flow may be selectively diverted by opening or lowering flow control gates 25a and 25b, respectively, in a manner generally known in the art. As used herein, the term "fish bypass" may include both structures for passing fish downstream with water flow as well as fish ladders and similar devices for permitting fish to migrate upstream against the flow of water. In operation, facility 16 generates electrical power by permitting water to flow through turbine units 18, and outputs the generated power on a power distribution grid (not represented).

As shown in FIG. 1, the series of facilities 16 along stream 14 forms a system, designated generally by the reference letter S, capable of both hydroelectric power production as well as water and fish management. In the exemplary embodiment described herein, system S regulates flow Q1 upstream of first facility 16a by appropriate control of the turbines of facility 16a and the bypass 23a and spillway 23b provided in dam 12a. Downstream of dam 12a, a tributary T1 adds flow Q2 to provide a resulting flow Q3 upstream of second facility 16b. Facility 16b is appropriately controlled, preferably in coordination with facility 16a by control of its turbines, bypass and spillway. A second tributary T2 may add additional flow Q4 downstream of facility 16b to produce a resultant flow Q5 upstream of third facility 16c. Facility 16c is then controlled, preferably in coordination with facilities 16a and 16b by control of its turbines, bypass and spillway.

Each facility 16 is instrumented and controlled as described more fully below. However, in general, a controller, designated generally by the reference numeral 48 includes facility controllers 48a, coupled to instrumentation and control actuators for each facility, and a system controller 48b linked to each facility controller 48a. Controllers 48a preferably collect data and control each facility, while system controller 48b coordinates operation of the facilities and monitors overall system parameters. Alternatively, a distributed control architecture could link facility controllers 48a directly to one another, or a more centralized structure could include relatively simple data collection and transmission controllers 48a and a single overall system controller 48b. Together, controllers 48a and 48b execute a predetermined control routine for implementing a desired power production, water and fish management plan for system S as described below.

Figure 2:
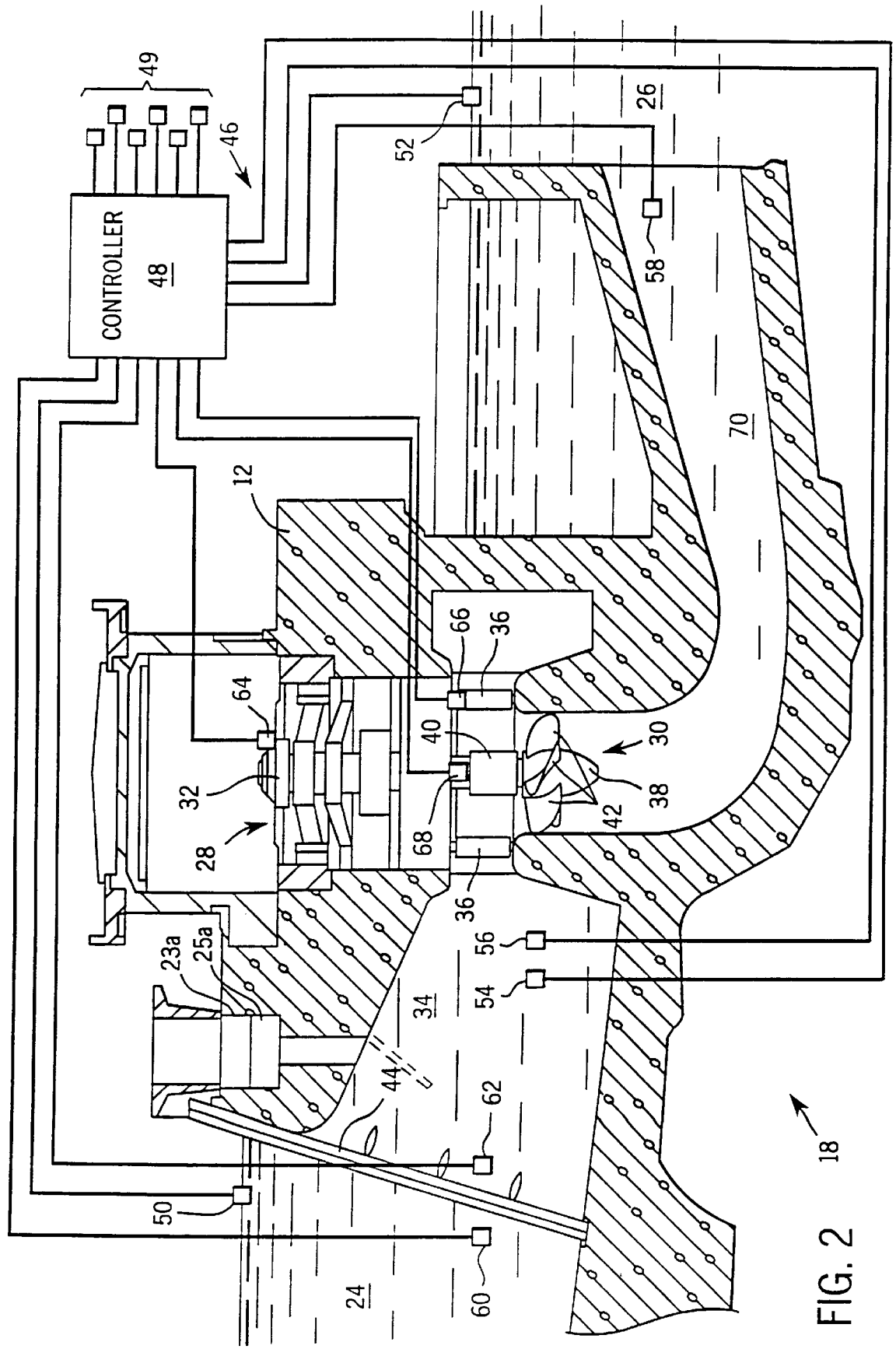
FIG. 2 is a diagrammatical representation of a hydroelectric turbine and bypass structure in a facility such as shown in FIG. 1, illustrating exemplary instrumentation for controlling operation of the facility.

Each turbine unit 18 may be of generally known design, such as including a vertical Kaplan turbine as illustrated diagrammatically in FIG. 2, for generating electrical power as water is allowed to flow through dam 12 from a headwater reservoir 24 of stream 14 to a tailwater side 26. It should be noted, however, that each installation 10 may include turbine units 18 of different types, such as movable blade and gate Kaplan turbines, fixed bladed propellor turbines, Francis turbines or pump-turbines where appropriate. Thus, while reference is made throughout the present discussion to control of surfaces in a Kaplan turbine, those skilled in the art will recognize the applicability of these teachings to other types of turbine units, all of which may be controlled in accordance with the invention.

Unit 18 includes a turbine support superstructure 28 built within dam 12. Superstructure 28 provides axial and radial support for a Kaplan turbine 30 and electrical generator 32. Turbine 30 is positioned within the flow path of stream 14, downstream of an upstream conduit 34 and movable wicket gates 36. Turbine 30 includes a runner 38 supported on a vertical shaft 40 and having a plurality of movable blades 42 disposed around its periphery for driving shaft 40 and generator 32 in rotation as water flows through dam 12. Unit 18 also includes a trash rack 44 upstream of conduit 34, typically comprising parallel, spaced-apart bars, for preventing large objects and debris from fouling or damaging turbine 30.

In the embodiment illustrated in FIG. 2, unit 18 includes a control system, designated generally by the reference numeral 46, including number of sensors 49, 50, 51, 52, 53, 54, 56, 58, 60, 62 and 64, and actuators 66 and 68 for controlling the turbine control surfaces. Similar actuators are provided for regulating the position of gates 25a and 25b of bypass 23a and spillway 23b, respectively. All sensors and actuators are coupled to a controller 48 by appropriate data links. For the purposes of controlling unit 18 and for enhancing survivability of fish entrained into and passed through unit 18, the sensors of control system 46 preferably permit detection of a set of operating parameters, including the presence and location of fish upstream from dam 12, levels of dissolved gases in the water (particularly dissolved nitrogen), water temperature, differential head from headwater 24 to tailwater 26, power generation level, flow through unit 18, cavitation, and trash rack head loss.

While a number of alternative methods are known in the art for directly or indirectly measuring these parameters, preferred sensing devices include the following. An array of hydroacoustic sensors 49 (see FIG. 1) is positioned at locations upstream of dam 12, both in the close vicinity of intakes to the facility and at greater distances, such as within several hundred feet and several thousand feet of dam 12. Such sensors generate signals representative of the presence, location and relative density of fish schools in headwater 24. These signals may additionally provide an indication of the type (i.e., species and maturity) of fish populations present. Stilling well-type transducers 50 and 52 measure the relative elevation or height of headwater and tailwater 24 and 26, respectively. Such measurements are used to determine the drop in head across dam 12 and for determining the submersion factor(s) of the turbine as an indication of the risk of cavitation within turbine 30. The submersion level is generally determined as a function of the difference between the tailwater elevation and a reference elevation for turbine 30 in a manner well known in the art. Temperature sensors 51, such as thermocouple devices, are positioned adjacent to each dam 12, providing an additional parameter on which fish behavior may be predicted as described below. Gas sensors, preferably continuous nitrogen sensors, 53 are provided upstream and downstream of each facility. Sensor 54, positioned, where feasible within upstream conduit 34, is a pressure transducer providing a signal proportional to head upstream of turbine 30, accounting for head losses between headwater 24 and gates 36. Where unit 18 has a relatively short upstream conduit 34, sensor 54 may be situated near its entry. Reference numeral 56 represents a sensor assembly positioned within upstream conduit 34 for generating a signal indicative of flow through unit 18. In the preferred embodiment, flow is determined by the well known Winter-Kennedy method, although alternative methods could be substituted, including the Peck method. Sensor 58, provided in the draft tube 70 of unit 18, is a pressure transducer similar to sensor 54 generating a pressure measurement signal and isolating losses from turbine 30 to tailwater 26. Sensors 60 and 62 are pressure transducers generating pressure measurement signals from either side of trash rack 44, and providing an indication of head loss across trash rack 44. Alternatively, trash rack losses could be indicated by measurements of headwater level (e.g. from sensor 50) and inlet head (e.g. from sensor 54). Finally, reference numeral 64 represents a power monitor providing a continuous signal indicative of the level of power being generated by unit 18.

In addition to the sensors described above, control system 46 is provided with actuator assemblies 66 and 68 for orienting control surfaces within turbine units 18, such as the surfaces of gates 36 and blades 42, at desired positions. Similar actuators (not separately illustrated) are provided for regulating the positions of the control surfaces or gates 25a and 25b of bypass structures and spillways 23a and 23b. Actuator assemblies 66 and 68, and the actuators for structures 23a and 23b may be of any suitable type known in the art, such as assemblies including hydraulic cylinders or motors coupled to mechanical linkages for effectuating the desired movement of the control surfaces and for holding the control surfaces in the desired positions against the force of impinging flow through unit 18. Moreover, the actuator assemblies preferably include sensors, such as potentiometers, linear variable differential transformers or the like, for providing feedback signals indicative of the actual positions of the control surfaces to which they are coupled. It should be noted that where turbine units 18 are of types other than Kaplan turbines, the control surfaces oriented by the actuator assemblies 66 and 68 may be accordingly those of elements other than gates 36 and blades 42.

Signals from the various sensors outlined above are applied to controller 48, which also serves to generate control signals for commanding the actuator assemblies to position gates 36, blades 42 and gates 25a and 25b in desired orientations. In the presently preferred embodiment, controller 48a includes an appropriately configured programmable logic controller executing a cyclic control routine stored in resident memory. Moreover, controller 48a is preferably also linked to other turbine units 18 within facility 16. Thus, where the other units 18 within facility 16 are comparably instrumented, controller 48a receives signals indicative of the operating parameters of all units 18 in facility 16, and controls operation of all gates and blades of the various units and of the spillways and bypass structures of the installation. It should be noted that, by virtue of its ability to share information indicative of the operating state of neighboring units 18, controller 48a may influence operation of some or all of units 18 based in part on the operating state of neighboring units to enhance fish survivability, as described more fully below. In addition, where controllers 48a of several facilities are linked either directly or through a system controller 48b, overall system operation may be scheduled or coordinated so as to implement system-level power, water and fish management plans.

In the presently preferred embodiment, control system 46 operates to orient control surfaces within units 18, including surfaces of gates 36 and blades 42, to regulate flow through units 18 and thereby, power levels generated by facility 16. Control system 46 also commands gates 25a and 25b of bypass and spillway structures 23a and 23b to permit controlled flow therethrough as desired. While the cyclic control scheme implemented by control system 46 may be of any suitable type, in the presently preferred embodiment, this routine provides optimal power production while balancing influences of a number of operating parameters on the short and long term performance of facility 16. For example, while control surfaces on gates 36 and blades 42 are positioned to produce the desired level of power, other parameters including flow rate, head, cavitation, vibration, operating states of other units in the facility, and so forth may be taken into account in determining the appropriate position of the control surfaces of each turbine unit. Particular aspects of the normal operating routine and optimization techniques utilized to balance such parameters are beyond the scope of the present disclosure.

It should be noted that although the exemplary turbine system described herein is of a fixed rotational speed type (i.e., the speed of the turbine and generator set are not readily adjustable), systems are known wherein rotational speed may be altered. In fixed speed turbine units, peak efficiency generally occurs at a fairly specific combination of head and flow. As head or flow changes, the point of operation moves away from the peak (see below discussion of FIG. 3A). Adjustable speed turbine units employ electrical conversion equipment enabling the power output of the facility to be stabilized despite variations in the rotational speed of the turbine/generator set. The combination of adjustable speed and more conventional gate opening techniques permits the system to remain at a near optimum efficiency level despite changes in head. For installations with large head variations, such systems offer particular advantages. It is contemplated that the present control technique may be employed in conjunction with such adjustable speed systems as well as with fixed speed systems to provide feedback on and control of fish survivability.

In accordance with the present technique, regardless of the particular general control routine implemented by control system 46, control system 46 includes additional functionality to accommodate the presence of fish and to appropriately modify the positions of control surfaces within facility 16 to enhance survivability of fish entrained into and passed through the facility. Moreover, control system 46 may interface with gates or other control devices to allow water to selectively flow through fish bypass 23a or spillway 23b, as appropriate, to implement a specific fish or water management program on a broader scale. As described in greater detail below, in a first preferred embodiment, the control routine may be modified to combine a parameter indicative of the presence, location and density of fish schools upstream of facility 16 with other operating parameters balanced by control system 46 when positioning the control surfaces of each turbine unit. In a second preferred embodiment, which may be considered a variant of the first, a signal indicative of imminent entrainment of fish into a turbine unit is used to override normal operation of the unit, or of adjacent units, to enhance the survivability of fish so entrained and passed through facility 16. However, prior to a more detailed discussion of these and other features of the invention, a brief discussion of the interaction of certain turbine operating parameters and their impact on fish survivability is in order.

In turbines generally, and in Kaplan turbines in particular, internal flow and geometry characteristics of the turbine vary as the point of operation (i.e., head, discharge, power production level) changes. Such internal characteristics are generally related to the design of the particular turbine, to the head and discharge points at which optimum efficiency is achieved, to the turbine discharge at the operating point relative to the optimum discharge, to the head at the operating point relative to the optimum head, and to the physical geometry of the internal control surfaces of the turbine unit. In a Kaplan turbine, for example, this geometry is related to the form and position of the wicket gates and runner blades and their position at various operating points. Moreover, parameters important to the short and long-term operation of the facility, such as flow quality and cavitation, vary as a function of the particular operating point of the unit.

Figure 3A:
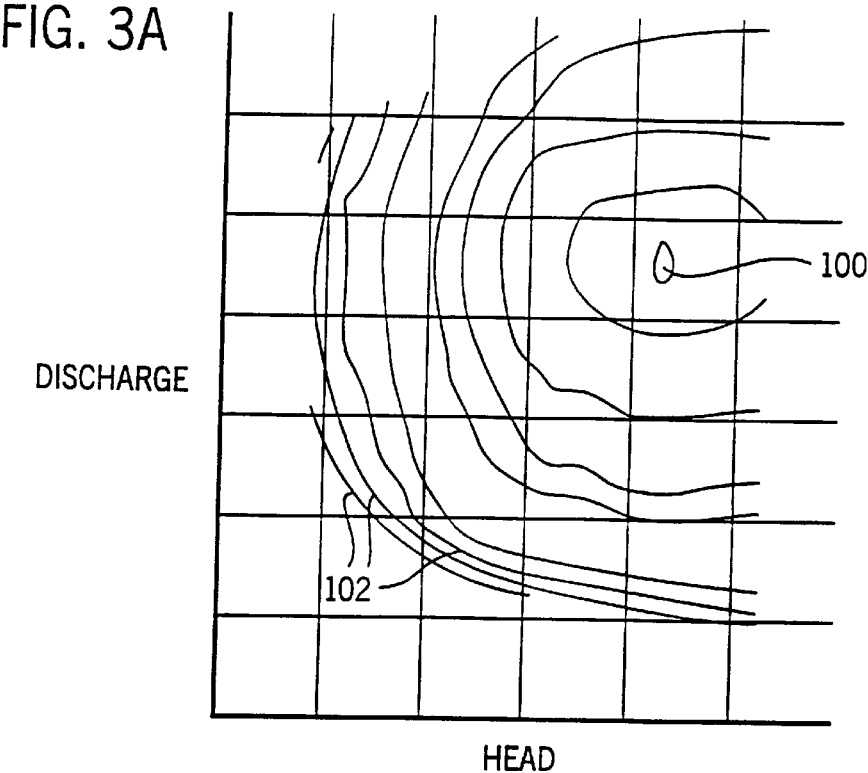
FIGS. 3A–3G are graphical representations illustrating interactions between various operating parameters of the facility of FIGS. 1 and 2 as they affect survivability of fish entrained into and passed through the a turbine unit.

As shown in FIG. 3A, when a turbine is operating at a constant head, an increase in discharge flow affects efficiencies of the turbine unit, with an optimal efficiency occurring at a predetermined region of head and flow as indicated by reference numeral 100 in FIG. 3A. Lines of constant efficiency can be drawn around region 100, as indicated by reference numeral 102 corresponding to decreasing efficiency as discharge and head are either increased or decreased. In general, operating the turbine unit at head and discharge levels other than those occurring at region 100, results in less potential energy from water flow being converted into power, and more energy being converted into turbulence which could negatively impact fish survival as discussed below.

Figure 3B:
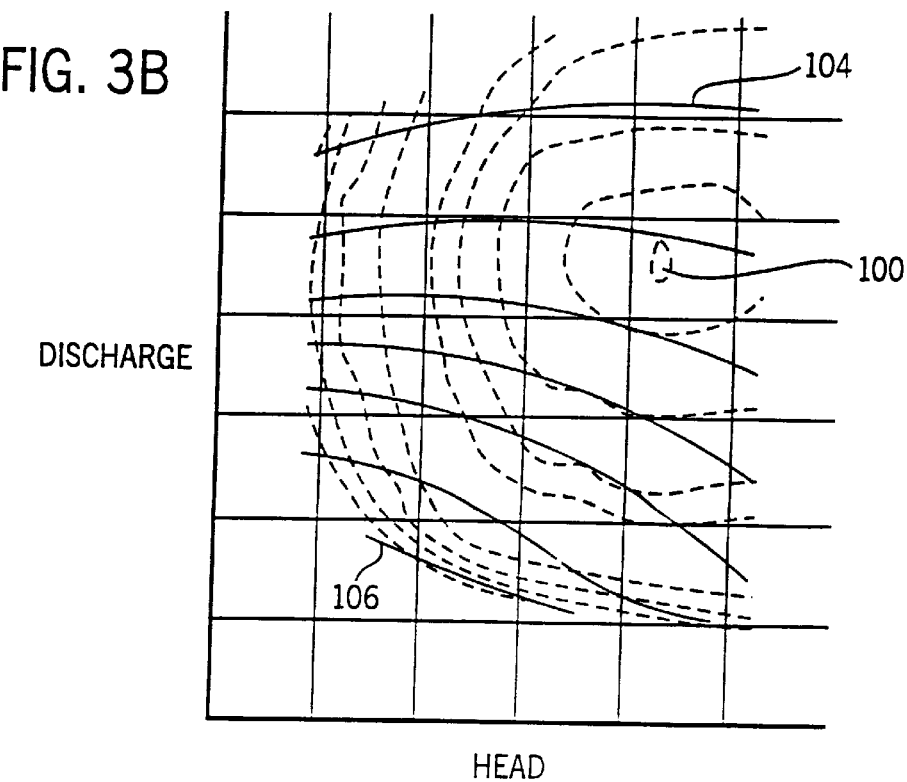
Figure 3C:
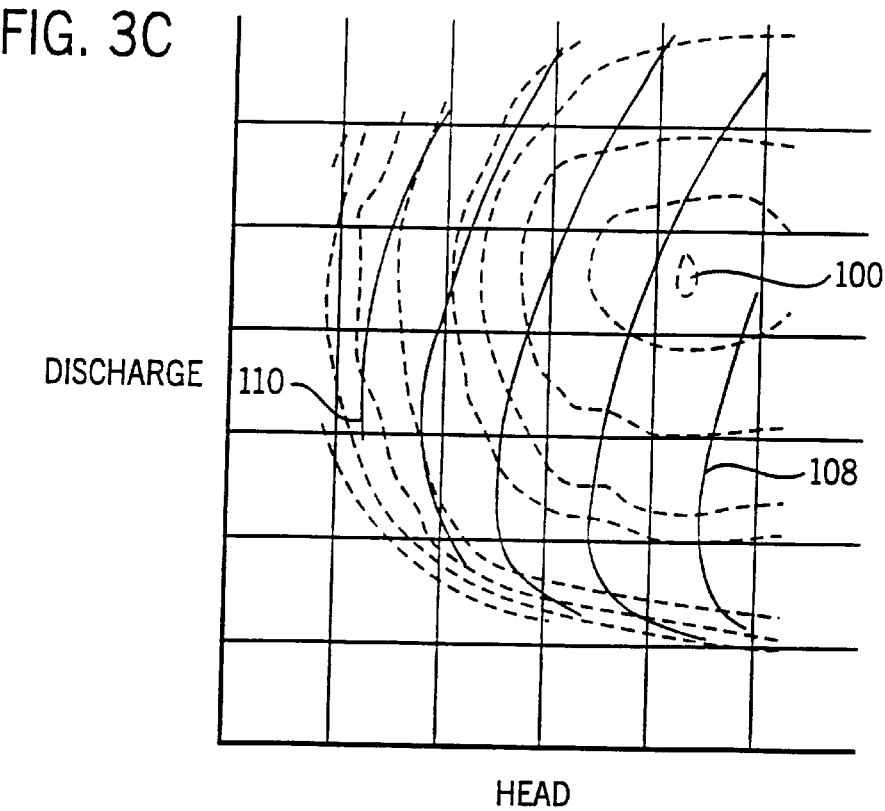

Most known optimization routines for the control of Kaplan turbines modify blade and gate positions to optimize their relationship to provide the best efficiency at a given discharge level, and to control discharge and power production. Depending upon the geometry of the particular turbine, certain regions of operation may create local geometries which can cause mechanical injury to fish entrained into and passed through turbine units. For example, the space between blades and between gates varies as a function of operating point. At low discharges, blades and gates are more closed in position, providing less space between adjacent components and yielding a higher statistical probability that fish may strike blades and gates, resulting in injury. FIG. 3B provides a graphical representation of lines of constant strike probability, expressed in percentages, superimposed on the lines of constant efficiency as a function of discharge and head shown in FIG. 3A. As indicated in FIG. 3B, the lowest probability of a strike incident, indicated by line 104, occurs generally at the highest discharges. Conversely, as discharge is decreased, the statistical probability for a strike within the turbine unit increases toward a lower range as indicated by line 106 in FIG. 3B. On the other hand, FIG. 3C indicates the kinetic energy of impacts normalized and superimposed on the turbine efficiency characteristic lines. As suggested by FIG. 3C, the normalized kinetic energy of impact is lowest at higher head levels, as indicated by line 108 in FIG. 3C and is highest at lower head levels, as indicated by line 110 in FIG. 3C. In general, the change in strike probability with discharge is much greater than the change in strike energy with head. However, at all heads, the kinetic strike energy multiplied by the probability of strike by the blades leads one to conclude that the more favorable discharges for fish survival of strike incidence with blades are the higher discharge rates, independent of the head across the facility. In addition, more favorable heads for fish survival of blade strikes are the higher head levels. It should be noted, however, that head across a facility is generally not readily controllable in relatively brief periods, while flow may be more easily manipulated by proper orientation of control surfaces within the turbine units. While speed of the turbine is similarly not directly adjusted in most installations, as noted above certain installations permit such speed adjustment. Where speed adjustment is possible, this too may be altered to reduce the potential of impact within the unit. It should also be noted that for the fixed speed example described above, the levels at which the lowest probability of strike occur and at which the lowest kinetic energy of impact occur are generally not coincident with the region of peak efficiency.

Figure 3D:
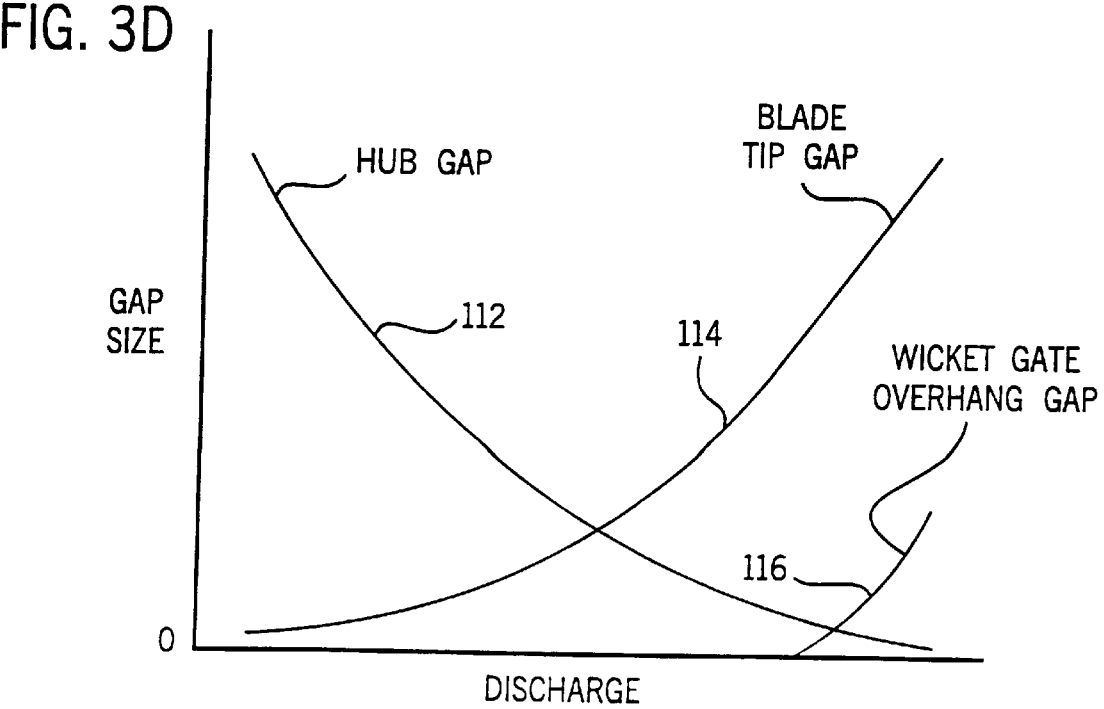

In addition to mechanical injury due to strikes within the turbine unit, other factors can affect the survival of fish entrained into and passed through turbine units. For example, at certain locations, such as near the bottom of wicket gates, such gates may overhang a discharge ring creating a control surface geometry which may cause injury to fish due to high velocity gradients and intense vortices. At the outer diameter entrance edge of the turbine blade, there often exists a tapering gap between the blade tip and the cylindrical surface of the upper discharge ring. At the inner portion of the blade, there is often another set of tapered gaps, a first at the blade leading edge at an interface between the blade and the hub, and another at the blade trailing edge at a similar interface. The often sharp edge converging gaps may trap fish and cause injury. In addition, leakage flow passing through these wedge-shaped gaps can create high velocity gradients and intense vortices, sometimes leading to cavitation. All of the above local geometries change shape as a function of blade and gate positions. FIG. 3D represents a relative size of hub side gaps, represented by reference numeral 112, blade tip gaps 114, and wicket gate overhang gaps 116. Hub side gaps are smallest at blade positions associated with high discharges. Blade tip gaps and wicket gate end gaps (if any) are lowest at small discharges. As will be apparent to those skilled in the art, the conflicting influence of discharge on gap sizes must be balanced in operation of the turbine unit in order to optimize fish survivability.

In addition to the above factors, the probability that a particular fish will be struck or injured by control surfaces within a turbine unit is related to the fish size in comparison to the turbine size and to the fish location within the flow through the turbine unit. Small fish passing through large turbines have a lower strike probability than large fish passing through small turbines. Planning for appropriate control surface orientation can sometimes be informed from known or empirically deduced fish behavior patterns. For example, juvenile salmonids tend to reside in an upper portion of the water column before entering the turbine unit. Consequently, when entrained into a turbine unit, such fish may tend to flow with water through the unit near the turbine hub and adjacent to tops of wicket gates, making local geometry in these regions more important to fish survival than geometry at the blade tip or wicket gate bottom.

Other influences of turbine operation on fish survivability can be evaluated through analysis of losses in the turbine unit. In particular, flow-induced losses (potential energy minus energy transferred to the generator shaft) as a percentage of potential energy can be estimated by the equation:

$$L = (1-\mathit{eff})^*H \qquad \text{Eq. 1;}$$

where eff represents the efficiency of the turbine (as a fractional value) and H represents the operating head across the turbine. The flow-induced losses can be separated into two principal classes. The first of these contains frictional losses related to flow passing across surfaces of the turbine structures. The frictional energy losses are generally lower at low discharge and highest at high discharges. Moreover, the intensity of force imparted to the fish related to such losses are generally small. This type of loss is not viewed as particularly detrimental to fish survival. In addition, such losses are not generally viewed as avoidable.

A second class of losses in a turbine unit is related to large-scale turbulent energy dissipation resulting from flow incidence on stay vanes, wicket gates, runner blade profiles, draft tube piers, and the like resulting from sudden expansion of flow at profile trailing edges and from strong secondary flows which may be induced by turning flow or which may result from profile loading, or from leakage flows through blade gaps or diffusion losses in the draft tube. Such large scale turbulent energy dissipation regions may be intense, having strong velocity gradients and flows of intense rotation. This fluid energy has sufficient power to create injuries to fish from pressure and momentum-induced forces on the fish body and through carrying the fish into contact with turbine structures. In a secondary effect, the rotational flow may cause disorientation to fish, leaving them subject to predation as they emerge from a turbine unit.

Figure 3E:
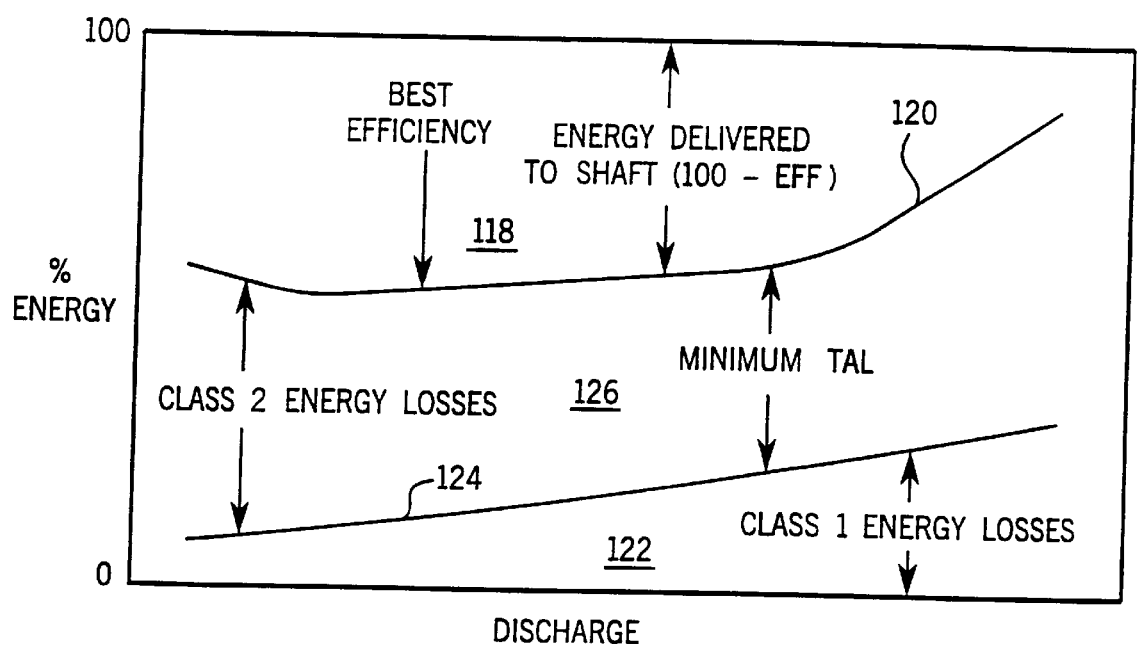

The above losses are viewed as detrimental to fish survival. They are a consequence of design geometries, but are inherent in all new and existing designs of turbines. While such losses can be reduced somewhat by more sophisticated design techniques, they generally cannot be eliminated totally. In general, such losses may be grouped in a class referred to, for present purposes, as "theoretically avoidable losses" (TAL). FIG. 3E provides a graphical representation of total energy distribution as a percentage of potential energy available from flow through a turbine unit as a function of turbine discharge at a given head. The energy is generally divided into that applied to the generator shaft (see the region labeled 118 and bounded by line 120), that associated with forcing flow through the turbine (see the region labeled 122 bounded along its upper edge by line 124), and that associated with theoretically-avoidable losses, TAL, as describe above (see the region labeled 126 between lines 120 and 124). TAL are dependent upon turbine geometry and operating point. As suggested by FIG. 3E, as discharge levels increase, TAL decrease to a minimum and thereafter begin to increase rapidly with further increases in discharge. It should be noted that the point of minimal TAL occurs at discharge levels above those for optimal efficiency, and in many turbine designs the minimum TAL occurs at discharge levels where efficiency is more than one percent below minimum efficiency.

Figure 3F:
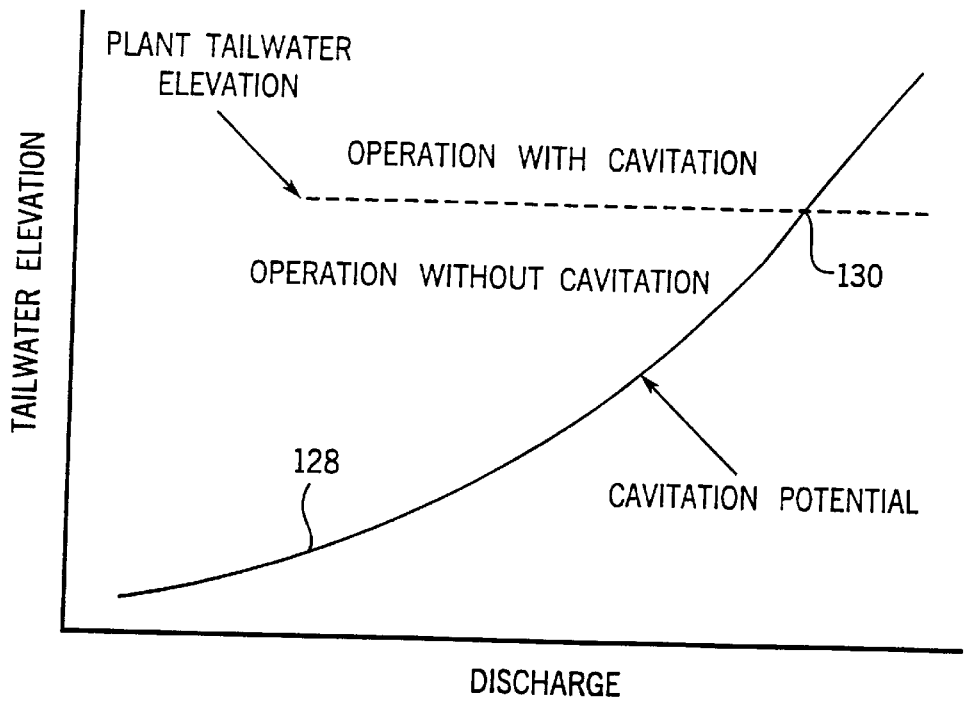

Cavitation can also result in considerable turbulence within the water passing through a turbine unit. Specifically, cavitation turbulence and pressure shocks result when water vaporizes due to low pressures and high velocities, and then the vapor bubbles collapse as they move into lower velocity, high pressure regions of flow. The high turbulence and high pressures associated with vapor bubble collapse are viewed as detrimental to fish survival. Operation of turbines in cavitating regimes should normally be avoided in order to maximize fish survival. FIG. 3F provides a graphical representation of cavitation potential, indicated by reference number 128 as a function of tail water elevation and discharge. At a predetermined point along the cavitation potential curve 128, indicated at point 130 in FIG. 3F, the cavitation potential curve crosses from a region of little cavitation to a region of increased cavitation. As will be apparent to those skilled in the art, cavitation potential can become critical at higher discharge levels.

An additional factor which may reduce survivability of fish is the amount of dissolved gases, particularly of nitrogen, in the water. High levels of dissolved nitrogen are known to result in fish suffocation in downstream ponds. Such nitrogen dissolution may occur in the turbine units themselves, or may result from passage of large quantities of water through bypass or spillway structures. In general, it is preferable to coordinate control of all such structures to produce a resultant level of dissolved nitrogen within predefined limits. For example, rather than pass water through spillways, it may be preferable to increase the flow through turbine units to reduce the overall level of dissolved nitrogen downstream of a facility. The resulting effect on fish survivability may be to increase the risk of impact within the turbine units, but to offset the additional risk with enhanced survivability due to reduced dissolved nitrogen levels.

Figure 3G:
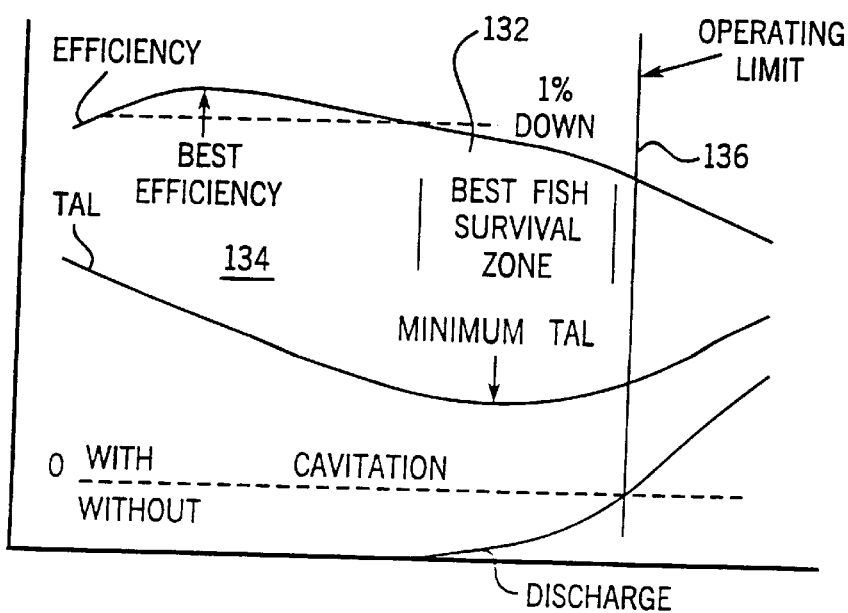

In summary, the various operating parameters of the turbine unit must be balanced in such a way as to provide orientation of control surfaces within the turbine unit at positions other than those dictated by any one parameter in order to maximize fish survival. As illustrated in FIG. 3G, based upon geometry-related strikes and impact energy, the effect of gaps within the turbine unit, the effect of flow turbulence and cavitation, and the location of fish flowing through the unit, the highest relative fish survival is expected to occur at higher discharge rates as indicated by zone 132 in FIG. 3G. Depending upon the particular turbine design, zone 132 may not correspond to an operating region of best efficiency, as indicated by reference numeral 134 in FIG. 3G. Moreover, while gap-related harmful effects on fish associated with wicket gate overhang of the discharge ring (if any) and blade tip to discharge ring gap occur at maximum discharge, as indicated by line 136 in FIG. 3G, the probability that a large portion of fish pass in the vicinity of these gaps is not large. It should be noted that the optimal positions of control surfaces for fish survivability will generally vary with the type and size of the turbine unit (and bypass structure) under consideration. Also, differences between units of the same type may result in different optimal fish survivability settings. In practice, the relationship between the orientations of the control surfaces and fish survivability will be determined by empirical testing or forecasting (e.g., numerical analysis or other techniques). The present technique provides a system for evaluating the presence of fish adjacent to the power generation facility and for properly orienting control surfaces within turbine units and bypass structures of the facility (based on the geometries and performance characteristics of the facility) in order to enhance fish survival and balance other parameters related to turbine unit and plant performance.

Figure 4:
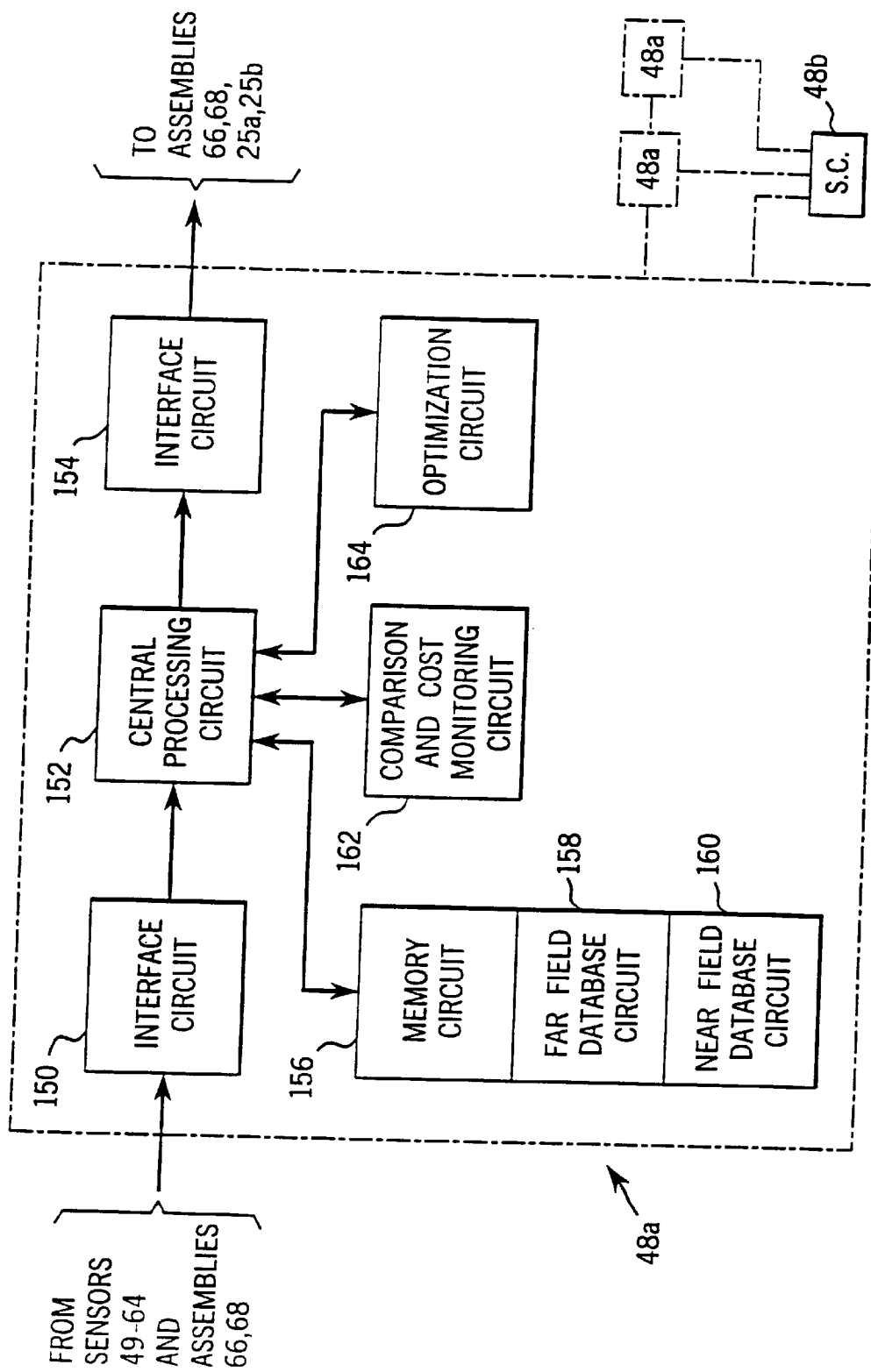
FIG. 4 is a block diagram of certain of the functional circuits in a control system in accordance with the present invention for controlling the hydroelectric power facility and system so as to enhance fish survivability.

FIG. 4 is a block diagram for a control system of this type. FIG. 4 illustrates certain functional circuits included in controller 48 when programmed to execute a performance optimizing base control routine adapted to include a fish presence parameter or to override normal operation based upon such a parameter as described below. Controller 48 includes an interface circuit 150, a central processing circuit 152, an interface circuit 154, a memory circuit 156 including a far field database circuit 158 and a near field database circuit 160, a comparison and cost monitoring circuit 162 and an optimization circuit 164. Interface circuit 150, which typically includes appropriate multiplexing, analog-to-digital converting and signal conditioning circuitry receives operating parameter signals from sensors 49–64 and feedback signals from actuator assemblies for turbine and bypass structure control surfaces, and applies these signals to central processing circuit 152. Similarly, interface circuit 154, which typically includes signal conditioning and valve driver circuits for operating the actuator assemblies, receives control signals from central processing circuit 152 and commands corresponding servo movement of gates 36, blades 42, and gates 25a and 25b. Central processing circuit 152 is also linked to memory circuit 156, comparison and monitoring circuit 162 and optimization circuit 164. In operation, central processing circuit 152 executes a cyclical control routine stored within memory circuit 156 for controlling operation of facility 16.

During certain phases of the control routine, central processing circuit 152 calls upon comparison and monitoring circuit 162 to compare signals indicative of the location and density (as well as any other known characteristic) of fish upstream of facility 16 with predetermined values. In response to the results of this comparison, central processing circuit 152 commands the actuator assemblies to move the control surfaces of one or more turbine units 18 and bypass structures to orientations known, from empirical or theoretical data, to enhance the statistical probability for survival of fish passing through facility 16. In one embodiment, when the comparison indicates that predetermined densities of fish are within close range of facility 16, central processing circuit 152 calls upon optimization circuit 164 to adjust the control surfaces to balance the fish-related parameter with other operating parameters as summarized below. Central processing circuit 152 accesses predetermined position values stored in memory circuit 156 and may effectively override the normal control routine implemented by central processing circuit 152 and position the control surfaces in desired orientations for enhancing fish survivability for durations sufficient to permit fish to be entrained into and passed through one or more turbine units or bypass structures. Moreover, central processing circuit 152 also preferably controls gates 25a and 25b of bypass structures 23a and 23b to permit water and/or fish to bypass the turbine units, in such a way as to implement a water and fish management scheme in conjunction with a power production schedule for the turbines.

Central processing circuit 152 also preferably processes the fish location and density signals and builds a database of information both for the near field (e.g., within the near vicinity of facility 16, such as 100 yards) and for the far field (e.g., from the limit of the near field to within 1000 yards or more of facility 16). The data stored in the far field is then used to analyze fish behavior, such as in terms of seasons or preferred paths of movement, for planning purposes. Data stored in the near field is used to correct far field data (such as relating to anticipated fish movement) and to trigger modifications in the control routine.

It should be noted that, in addition to control of the operating parameters of each facility 16, the central processing circuits 152 linked to each facility in system S preferably coordinate their control on a system-wide level. Thus, as described below, a central processing circuit 152 for a first facility 16a may restrict flow through or around its turbines in order to retain or pond water and/or fish on its upstream side. Water may later be released through the turbines or bypass structures to permit water and fish populations to flow toward downstream facility 16b. Similarly, power production may be coordinated in each facility, and between the facilities to permit fish to make their way back upstream, such as for spawning, during certain seasons by opening control gates of one or more fish bypasses 23a.

As will be appreciated by those skilled in the art, the functional circuitry represented in FIG. 4 may be defined by standard input/output circuitry, memory circuitry and programming code in a standard programmable logic controller, personal computer, computer workstation or the like. For example, in the presently preferred embodiment, central processing circuit 152, in the form of a programmable logic controller dedicated to facility 16, is provided with resident memory for executing a main control routine. Comparison and monitoring circuit 162 and optimization circuit 164 are configured in the same computer system as the programmable logic controller. Alternatively, comparison, monitoring and optimization circuitry may be configured in separate devices at or entirely remote from facility 16 and selectively linked to central processing circuit 152 by modem or other telecommunication device.

Figure 5B:
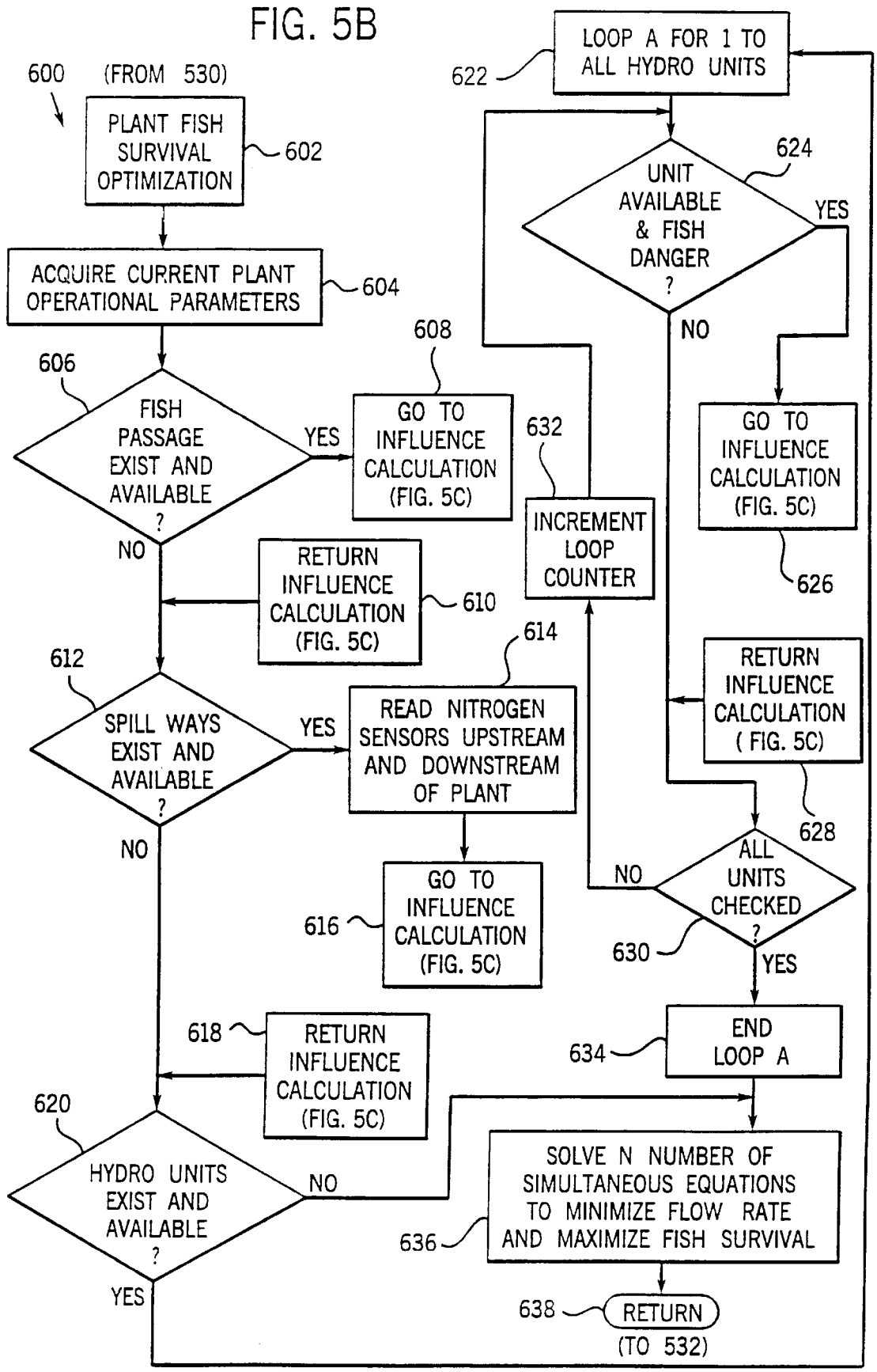
Figure 5C:
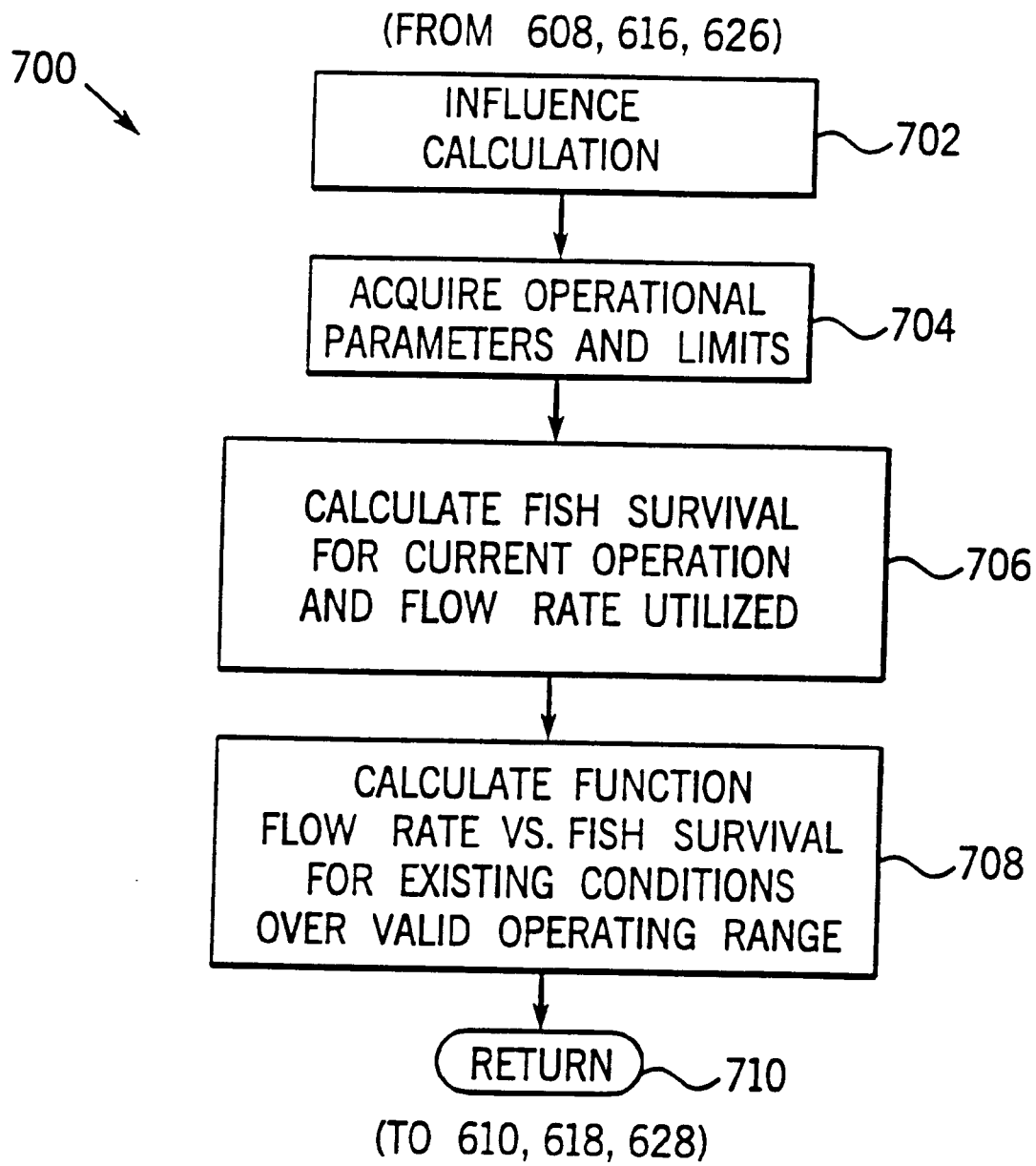
Figure 5D:
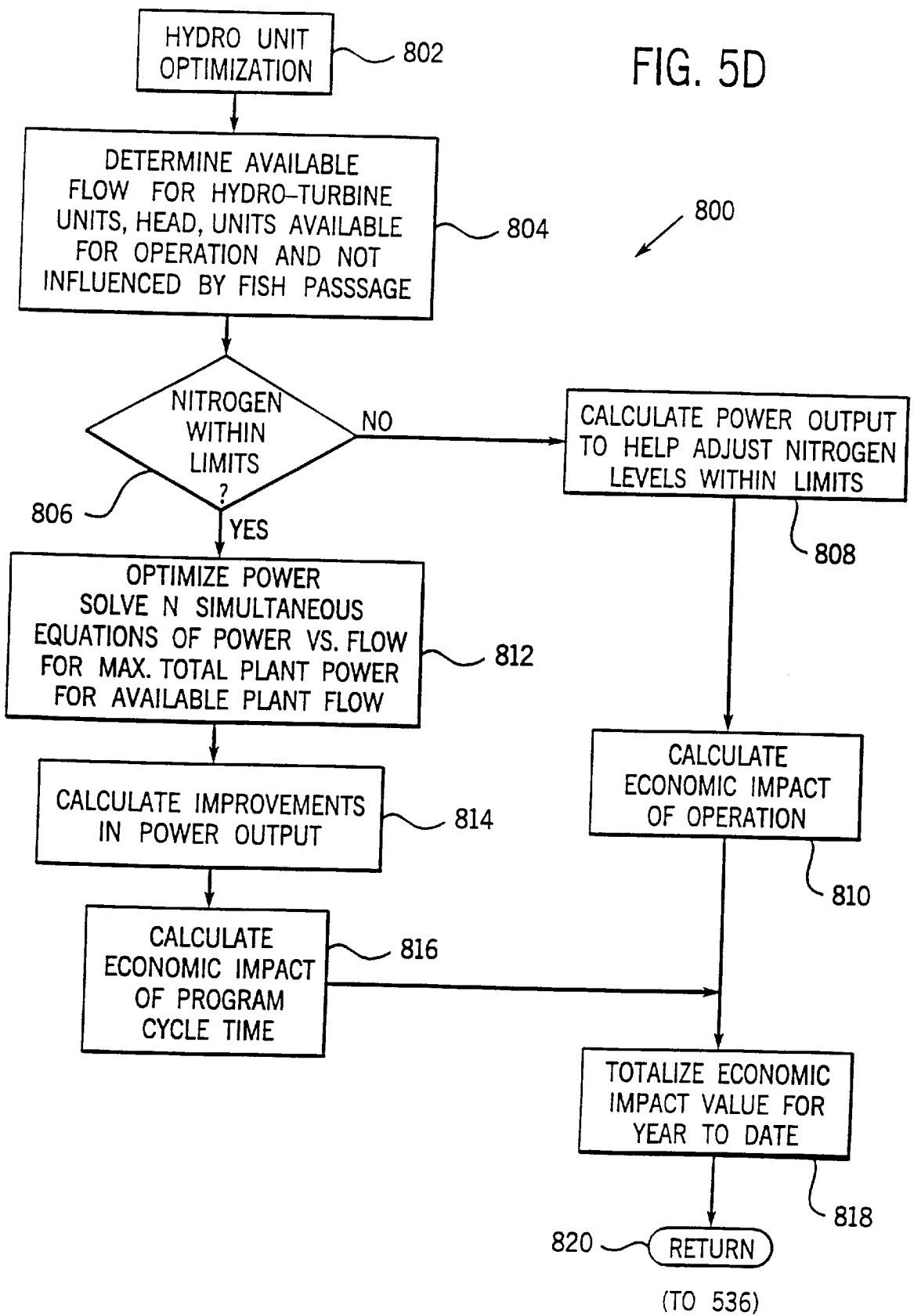
Figure 5E:
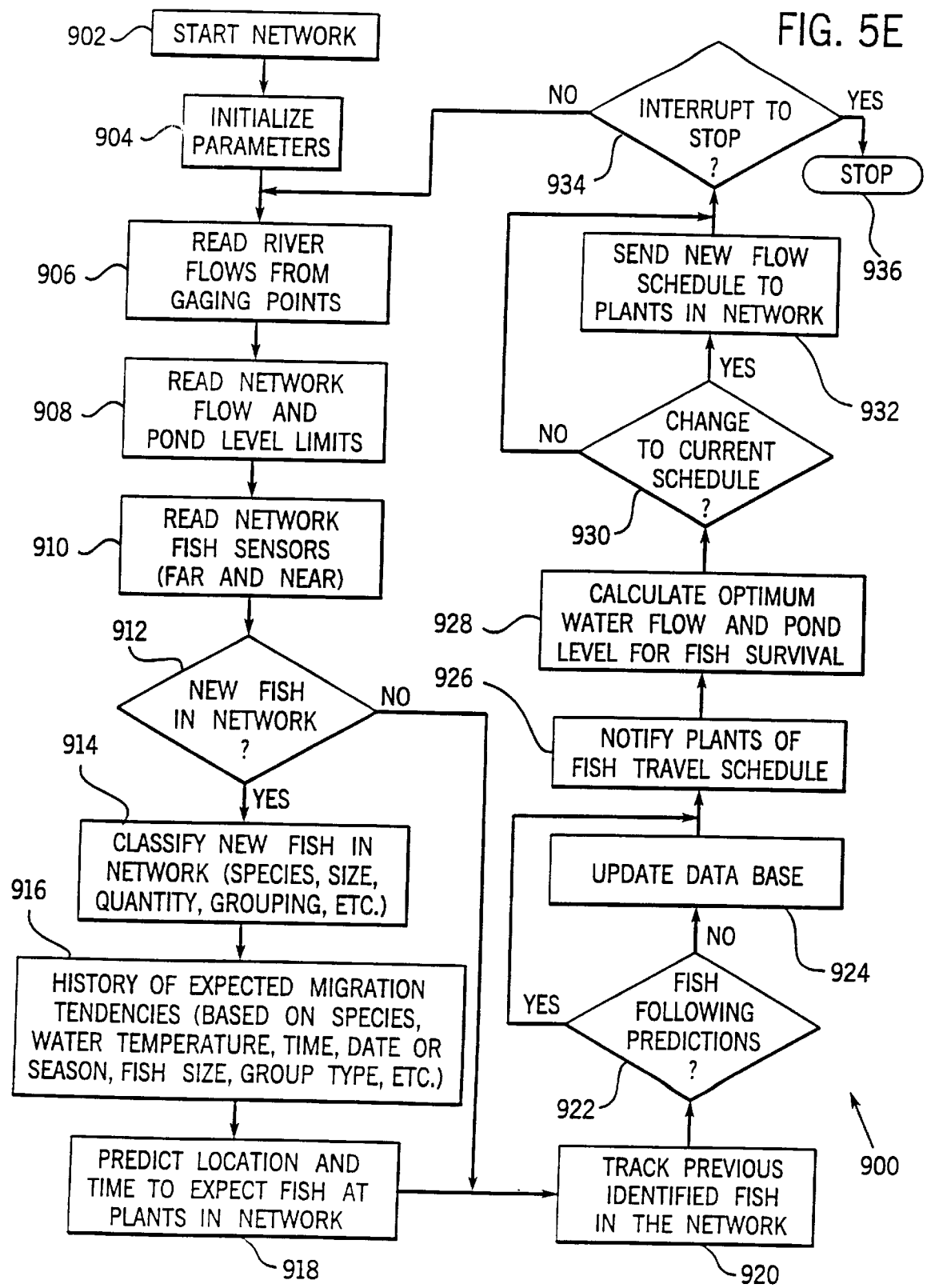

FIGS. 5A–5E represent exemplary control logic implemented by the control system for performing the functions described above. In particular, FIG. 5A represents steps in control logic for features of a control routine for enhancing fish survivability through a single installation. FIG. 5B represents a portion or subroutine of the control logic particularly adapted for determining the influence of various control surface positions on fish survivability. FIG. 5C represents exemplary steps in an influence calculation subroutine for use in the logic of FIG. 5B. FIG. 5D represents a power optimization and cost monitoring subroutine which is preferably part of the logic illustrated in FIG. 5A. FIG. 5E represents exemplary control logic for sharing information between several installations on a system-wide level and for coordinating control of such installations.

Returning now to FIG. 5A, the fish survivability control routine, designated generally by reference numeral 500 begins at step 502 wherein the routine is implemented and central processing circuit 152 is brought on line. At step 504, central processing circuit 152 initializes parameters to be considered and used by the routine. In general, this initiaization step sets initial conditions and limits for turbine units, bypasses and the like included in the facility being controlled. Such limits preferably relate to the maximum allowable positions of control surfaces, maximal allowable flow, power production targets, power production scheduling, and so forth. In step 506, central processing circuit 152 establishes communication with the various sensors and actuator assemblies with which control is carried out (as represented in FIG. 4). If satisfactory communication is established with all of the necessary control elements, central processing circuit 152 advances to step 508. In certain circumstances, control may advance to step 508 despite minor malfunctions of these elements. For example, control of turbine units will generally be possible despite malfunctions detected in fish bypasses or spillway structures. Similarly, control may advance so as to regulate flow through the facility through such bypass structures even when one or more turbine units is not currently functioning, such as due to regularly scheduled maintenance.

At step 508, central processing circuit 152 accesses fish present signals provided by sensors 49 and scans the signals for indications of fish within the far field. As indicated above, such signals preferably provide an indication of both the presence and relative density of fish schools within a predetermined range adjacent to the facility. It should be noted, that as used herein the term "upstream" relating to the position of fish adjacent to a power generating facility may not correspond to the generally accepted meaning of that term in relation to the direction of water flow. In particular, routine 500 permits control of certain control surfaces, particularly of fish ladders, permitting fish to migrate in a direction counter to gravity flow of water. If fish are determined to be present in the far field, central processing circuit 152 advances to step 512. If fish are not found to be present, control advances to step 520 as described below.

At step 512, central processing circuit 152 acquires operational data from the various sensors indicated above as well as from memory circuit 156. Such data generally will provide an indication of which units in a facility are currently in an operational state, the details of the operational state including flow, power generational level, control surface orientation and so forth. In addition, at step 512 central processing circuit 152 preferably polls sensors 51 and 53 to provide an indication of the current water temperature adjacent to the facility being controlled as well as of the dissolved nitrogen levels in the water on either side of the facility. In step 514, central processing circuit 152 accesses information from far field database 158 to classify any fish schools determined to be present in step 512. Such classification will preferably include a number of parameters including the species of fish (where ascertainable from the fish presence signals), the size of the fish, the density of the schools and the location of the fish. The location data is preferably categorized in several ways, including by distance from the facility, by relative position between the banks of the stream or pond, and according to depth. At step 516, central processing circuit 152 attempts to correlate the multiple parameters relating to the fish identified in the preceding steps with information stored in far field database circuit 158. The parameter fields stored in this circuit are preferably correlated in a multi-dimensional table or matrix permitting a comparison of ranges of the parameters stored with particular values of parameters detected by the sensors. In particular, a multi-dimensional fish-related matrix is preferably established including information on species, water temperature, time, date (or season), fish size, group size, and location. Where central processing circuit 152 does not detect a close match in the fish-related parameters, it preferably downloads the current parameters and establishes field ranges around them for a later reference. Where a match in the parameters is detected, central processing circuit 152 accesses trend data, also preferably stored in database circuit 158 indicating probable movement of the fish in the conditions detected. Over time, this movement data will preferably be established by successive locational information on specific fish species and sizes. Thus, far field database circuit 158 will be progressively populated with data corresponding to a wide variety of combinations of the parameter ranges monitored.

Based upon matches of current fish parameter information with data stored in database circuit 158, central processing circuit 152 advances to step 518 to predict the location and time at which fish may be expected to enter into the near field. As indicated above, the particular definition of the far field and near field and the distinction between these two fields will generally be specific to the particular installation being controlled. In general, it is presently contemplated that the near field will extend to an immediate vicinity adjacent to the facility, such as within several hundred feet, while the far field will extend up to several thousand feet from the facility. From step 518, central processing circuit 152 advances to step 520 where the data supplied by sensors 49 are once again scanned for indications that fish are present within the near field. At step 522, the determination is made whether such fish are present. If no fish are detected within the near field, control returns to step 508 to continue scanning the far field and correlating parameters relating to fish presence with those stored in far field database circuit 158. If at step 522 fish are detected within the near field, control advances to step 524 wherein the fish so detected are classified in a manner similar to that described above with respect to step 514. The information determined at this step, similar to that evaluated in step 516 is then added to near field database circuit 160 to begin populating that database.

At step 526, a comparison is made between the current data found in near field database circuit 160 and the prediction made at step 518. In particular, control circuit 48 attempts to validate the prediction made by virtue of information stored in the far field database circuit with actual data collected on fish present in the near field. If the location and time data correspond relatively closely to that determined at step 518, control advances to step 530. If the prediction is found to be substantially different from the actual collected data, far field database circuit 158 is modified to correct its predictive function. As will be appreciated by those skilled in the art, a number of analytical methods may be employed for correcting far field database circuit 158 based upon the accuracy of fish movement predictions. In particular, over time statistical correlations may be generated to provide an indication of the relative accuracy of the prediction. Such statistical analysis may generally result in the provision of a predicted range of times and locations at which particular fish schools should arrive within the near field. From either step 526 or 528, control advances to step 530 where a plant fish survival optimization routine, summarized diagrammatically in FIG. 5B is called as described below.

Referring now to FIG. 5B, fish survival optimization routine, indicated generally by reference numeral 600, begins at step 602. Optimization routine 600 is generally executed in a portion of central processing circuit 152 represented by optimization circuit 164 in FIG. 4. As described above, circuit 164 may be a separate module or may be configured as a subroutine or other code module within central processing circuit 152. At step 604, optimization circuit 164 acquires current plant operational parameters. These parameters may be transferred from central processing circuit 152 or from any other controllers included in the facility. In general, the parameter values accessed at step 604 correspond to the operational data accessed at step 512 as described above. Depending upon the overall control routine implemented by central processing circuit 152, the parameters required by optimization circuit 164 will include particular limits within which the facility must operate. Such limits will generally include maximum and minimum flows, power generation limits, fish survival targets (generally expressed as a percentage of fish passage), cavitational limits, head limits and so forth. Once the current operational parameter values are acquired, control passes to decision block 606 where optimization circuit 164 analyzes these parameters to detect whether a fish bypass structure is available for operation. Thus, the inquiry made at step 606 involves not only whether such a bypass structure exists in the facility, but also whether the gate for controlling the structure is fully operational. In addition, in certain circumstances, such structures may be nonoperational beyond certain limits due to the level of water necessary for adequate flow across or over them. If fish bypass structures are detected and are available for control, optimization circuit 164 advances to step 608. From step 608, optimization circuit 164 implements an influence calculation control routine summarized in FIG. 5C. This control routine will be summarized below following the present discussion of FIG. 5B. Step 610 represents the return from the influence calculation subroutine. In general, upon return from the subroutine summarized in FIG. 5C, optimization circuit 164 will have determined or estimated a correlation between the flow available through the fish passage structure and the amount and survivability of fish which could be ultimately entrained in such flow. If at step 606 no fish bypass structures are detected or such structures are not available for control, optimization circuit 164 advances to step 612.

At step 612, optimization circuit 164 accesses information acquired at step 604 relating to whether spillways are present in the facility and are available for control. As indicated above with respect to step 606, even where such spillways are present, mechanical or other malfunctions may render them unavailable. If such structures are detected and are available for control, circuit 164 advances to step 614 where information on nitrogen levels detected by sensors 53 is accessed. As discussed above, because flow through spillways may result in significant dissolving of nitrogen in the water, which may adversely affect fish populations, the current levels of nitrogen in the water are of particular relevance in determining whether control surfaces of available spillways should be utilized in optimizing fish passage. At step 616, optimization circuit 164 advances to the influence calculation subroutine summarized in FIG. 5C. Step 618 represents the return from this routine. Upon returning from the influence calculation subroutine at step 618, optimization circuit 164 will have correlated available flow through existing and controllable spillways in the facility with possible fish passage quantities and estimates of fish survival.

At step 620, optimization circuit 164 determines whether hydroelectric power generation units exist in the facility and are available for control. As indicated above with respect to fish passage and spillway structures, such turbine units may exist within the facility but be unavailable for control due, for example, to special or scheduled maintenance. In addition, certain turbine units within the facility may be generally operational but only within a limited range of flow. If no such units are present or available for control, optimization circuit 164 advances to step 636 to determine the appropriate settings of the fish bypass structures and spillways as described below. If, on the other hand, such units are available for control, optimization circuit 164 advances to step 622.

Step 622 represents entrance into a continuous loop in which influence of each turbine unit on fish passage and survivability is successively determined. In general, the loop beginning at step 622 will be repeated for all available turbine units. When first accessed, step 622 will set a loop counter at a value of unity and set a maximum number of loop passages to a value corresponding to the number of turbine units available for control. As indicated above, each passage through the loop beginning at step 622, may result in evaluation of turbine units of various size and configuration. Thus, a first passage through the loop may correlate flow through a variable blade Kaplan turbine, while subsequent passes through the loop may evaluate fixed bladed propellor turbines, Francis turbines and so forth at various locations along the facility being controlled.

At step 624, optimization circuit 164 determines whether the turbine unit being evaluated is available for power generation and whether there appears to be the imminent possibility that fish will be entrained into the unit. The latter determination is made by reference to the results of the inquiry at step 522 summarized above (see discussion of FIG. 5A). If fish have not been detected within the near field, the present control technique assumes that there is no imminent need to modify operation of the turbine unit being evaluated. Accordingly, control of the turbine unit may be optimized based upon other parameters implemented by other aspects of the overall control routine, such as power production level or operating efficiency. Thus, if a particular unit is either unavailable for control or is not predicted to pass fish within the near future, control proceeds to step 630. If, on the other hand, the unit is available for control and fish have been detected in the near field, control advances to step 626 where the influence calculation subroutine summarized in FIG. 5C is again accessed. Step 628 represents return from this routine. Upon return of step 628, optimization circuit 164 will have correlated the available flow through the turbine generating unit with the impact of such flow on fish passage and survivability. At step 630, optimization circuit 164 performs a comparison to determine whether the loop counter has reached the final value and, if not, proceeds to step 632. At step 632, the loop counter is incremented and control returns to step 624 to perform the steps identified above with respect to the next turbine unit in the facility. If at step 630, optimization circuit 164 determines that all units have been analyzed, control advances to step 634 where the turbine unit analysis portion of routine 600 is terminated.

Based upon the influence correlations made for the facility equipment available for control, optimization circuit 164 determines the desired flow through each at step 636. As described below, the influence calculation subroutine summarized in FIG. 5C results in a determination of a mathematical correlation between the flow available through fish bypass structures, spillways and turbine units in the facility and an estimate of fish passage and fish survivability. It is presently contemplated that this correlation will correspond to a function which may be represented as a curve or surface relating flow (determined by the position or orientation of the control surfaces associated with the particular structure), the quantity of fish passed through the structure and the percentage of that quantity estimated to survive the passage. Thus, at step 636, optimization circuit 164 implements an optimization algorithm for determining the total quantity of flow to be passed through the facility and partitioning the flow between the various structures available for control.

As will be appreciated by those skilled in the art, flow through the facility may be correlated with both power production levels and, generally, revenue available from such production. However, where fish survivability targets exist and should be maintained, such revenue may be foregone in an effort to realize the survivability targets. In general, the presently preferred algorithm implemented at step 636 provides for passage and survival of a maximum quantity of fish in a minimum quantity of water. Depending upon the particular circumstances (e.g., location and predicted behavior of the fish), this technique may result in manipulation of a fish bypass structure, spillway, turbine unit or all of these. If all structures would result in similar fish bypass quantities and survivability, the presently preferred technique opts in favor of passage of water through power-generating turbine units. That is, if fish survivability targets can be reached (and other water management goals can be attained) by operation of turbine units alone, this approach will generally be preferred. Moreover, the hierarchy thus established between the available control structures will generally be followed from the turbine units through the fish bypass structures and spillways until the target level of fish survivability is attained. Thereafter, optimization circuit 164 will generally optimize power production in a manner generally known in the art. Where the controllable structures, given the available flow, cannot attain the predetermined survivability target, the algorithm implemented in step 636 will preferably provide a solution for positioning control surfaces of all available structures so as to attain the best possible fish survivability results. Following step 636, optimization circuit 164 will have determined the preferred position or an allowable range of positions of the control surfaces of the structures available for control in the facility and further optimization can be implemented based upon other parameters, such as power-generation level or operating efficiency. Control then advances to step 638 wherein central processing circuit 152 returns to step 532 of routine 500 as described below.

Referring now to the influence calculation subroutine summarized in FIG. 5C, the routine, indicated generally by reference numeral 700, begins at step 702 which may be reached from any one of steps 608, 616 or 626 summarized above. At step 704, optimization circuit 164 accesses current operational parameters and the parameter limits for the particular structure under evaluation (fish bypass 23*a*, spillway 23*b* or a turbine unit 18). As indicated above, such parameters will and limits will generally relate to positional limits for the actuator assemblies or control surfaces associated with the structure. In addition, for turbine units, such parameters will relate to maximum and minimum flows, current head levels and limits, cavitation limits and so forth.

In addition, for spillways and turbine units, these parameters preferably include nitrogen levels on either side of the facility. Moreover, where an adjustable speed turbine unit is under evaluation, the parameters accessed at step 704 will include the current speed and speed adjustment range of the turbine unit. At step 654, optimization circuit 164 determines estimated fish survivability rates as a function of flow through the particular structure under evaluation. The correlations made in step 706 are preferably based either upon empirical data obtained through testing of the structure or upon estimated data determined through analytical techniques of the type known in the art. Such techniques will generally provide an estimate of fish survivability as a function of the positions of the control surfaces in the structure. Thus, at step 706, a number of discrete positional settings are preferably evaluated to develop a range of such settings for the current operating conditions. At step 708, fish survivability estimates are then generated based upon the predetermined relationships for the structures and the series of settings over the then-current operating ranges. The resulting correlated data is stored in memory circuit 156 for later use in step 636 as described above.

In general, the resulting information provides an indication of the fish passage and survivability attainable via flow through or over the structure being evaluated as a function of flow rate. As indicated above, at step 636 a preferred hierarchy of controllable structures is established so as to select the proper structure for the available flow and simultaneously to attain the fish survivability targets set for the facility. At step 710, optimization circuit 164 returns to routine 600 at step 610, 618 or 628 as described above.

Having completed the optimization routine 600 summarized in FIG. 5B including the influenced calculation subroutine summarized in FIG. 5C, central processing circuit 152 proceeds through routine 500 by returning to step 532 (see FIG. 5A). At step 534, central processing circuit 152 calls an additional subroutine summarized in FIG. 5D. FIG. 5D represents control logic for a turbine unit optimization routine designated generally by reference numeral 800. Routine 800 begins at step 802 and proceeds to step 804 where the flow range available for all turbine units in the facility is accessed. In the presently preferred embodiment, the particular flow rate for turbine units for which fish entrainment is imminent will have been set at step 636 of routine 600. Therefore, at step 804, operational parameters of units not affected by imminent fish passage will be acquired. Alternatively, the determinations made in step 636 may indicate that certain units for which fish passage is imminent may nevertheless operate over a range of settings providing little or no change in fish survivability. Where such is the case, these units may also be optimized through routine 800 and their current operational parameters are accessed at step 804 as well. At step 806, central processing circuit 152 compares current nitrogen levels, as indicated by sensors 53, with allowable limits for nitrogen levels which may be saved in memory circuit 156. Such limits may be set in an effort to limit fish mortality. When the comparison made at step 806 determines that nitrogen levels are not within allowable limits, control proceeds to step 808. When nitrogen levels downstream of the facility are determined to be elevated above allowable limits, additional water passed through available turbine units with lower nitrogen levels may be useful in diluting the higher nitrogen level water downstream. However, increasing the discharge rate through the turbine unit will generally result in lower operating efficiency of the unit as indicated by FIG. 3A discussed above. Thus, at step 808, central processing circuit 152 performs a calculation or estimate of the effect of such higher discharge rates on the power output of the turbine units available for control. If the added discharge through the turbine unit is determined to be helpful in reducing the dissolved nitrogen levels while remaining within acceptable limits of power output, control surface orientations corresponding to such higher discharge levels are adopted and control advances to step 810. It should be noted that as an alternative to this control logic, circuit 152 may be configured to shut down any spillways or to reduce flow through them to reduce the level of dissolved nitrogen in the downstream water.

At step 810, the economic impact of operation at the adopted control surface settings is calculated. To accomplish the calculation of step 810, central processing circuit 152 calls upon a comparison circuit and cost monitoring circuit 162. In the presently preferred embodiment, circuit 162, which may be a separate module or a program submodule within code implemented by circuit 152, calculates the power output level and operating efficiency of the turbine unit in both an optimal setting and in the setting adopted at step 808 to improve dissolved nitrogen levels. A comparison is then made in circuit 162 to determine a difference between these two power production and efficiency levels. The resulting difference value is then multiplied by a cost estimate representing the value of lost power production and efficiency resulting from operation at the less-than-optimal settings. In addition, the evaluation made at step 810 preferably includes factors for estimating other costs associated with operation of the turbine unit at such conditions, including costs resulting from increased cavitation levels, costs associated with structural repairs accelerated by such operation, and costs of any elevation in fish mortality resulting from such operation. These costs are summed at step 810 and control advances to step 818.

Returning to step 806, if nitrogen levels downstream of the facility are determined to be within acceptable limits, control advances to step 812. At step 812, central processing circuit 152 attempts to optimize power production and efficiency by balancing flow through the turbine units available for optimization (i.e., for which a range of adjustment is still available after fish survival optimization). Various optimization routines may be implemented at step 812 to determine the best setting of the available turbine units within the available operating ranges. The particular optimization routine implemented is beyond the scope of the present disclosure. At step 814, a determination is made of any improvements made in power output by virtue of the optimization routine implemented at step 812. At step 816, the economic impact of fish survival optimization routine 600 is determined. Specifically, central processing circuit 152 preferably again calls upon comparison and cost monitoring circuit 162 to evaluate both the estimated power production that would have resulted from operation of the facility without regard to fish presence as well as the actual performance of the facility at the settings selected. The resulting values are compared and any difference between the values is multiplied by an estimate of the cost associated with such operation as summarized above with respect to step 810. The cost estimate calculated at step 816 is preferably limited to the time required for cycling through the entire control routine summarized in the present discussion. Subsequently, at step 818 a running total of the cost of operation at the less-than-optimal power production levels is calculated by adding the value resulting from step 816 or step 810 to an existing running total. Control then advances to step 820 wherefrom central processing circuit 152 returns to step 536 (see FIG. 5A). At step 538 shown in FIG. 5A, the settings for positions of the control surfaces as determined above are conveyed to corresponding actuator assemblies via interface circuit 154. The corresponding control surfaces are thus oriented at their selected positions until subsequently moved by determinations made in subsequent cycles through the control routine summarized above. At step 540, central processing circuit 152 polls operator interface devices for an interrupt command and, if none is found, returns to step 508. If an interrupt command is received, the routine is exited at step 542, or may be configured to pause or to prompt the operator to enter new data.

In accordance with a preferred embodiment of the control system, control of several facilities along a stream that may be coordinated so as to implement a system-level power production, water and fish management plan. FIG. 5E represents steps in control logic implemented by the control system in accordance with this aspect of the invention.

The system-level control routine, designated generally by reference numeral 900 begins at step 902 and at step 904 operational parameters are initialized in a manner similar to that described above with reference to step 504 (see FIG. 5A). At step 906 flow rates at various points along the stream are read, preferably from gauging points. Such gauging points are generally provided for estimating river flow based upon elevation of the stream at particular gauging points. At step 908, flows and pond level limits are read by a system controller, such as controller 48b illustrated in FIG. 1. In the presently preferred embodiment, system controller 48b is linked to individual controllers 48a associated with each facility being controlled along the stream. Thus, initialized parameters, river flows and pond level limits may be fed from the individual controllers monitoring such parameters to the system controller for coordination in routine 900.

At step 910, information collected by individual controllers 48a relating to the presence of fish in far and near fields are transmitted to system controller 48b. As described above, such data preferably relates to the location, density, and species of fish, both immediately adjacent to the facility and within a predetermined distance beyond the immediate vicinity. At step 912, system controller 48b evaluates the signals transmitted at step 910 to determine whether new fish are present within the overall system or network of facilities. As will be apparent to those skilled in the art, the inquiry at step 912 is made by comparing previous data relating to fish already located in the system with new current data accessed at step 910. If no new fish have entered the network, control advances to step 920. If, on the other hand, new fish are detected within the network, these fish are classified to the extent possible at step 914. The classification performed at step 914 preferably provides information such as that provided at steps 514 and 524 described above with reference to FIG. 5A. At step 916, a database, preferably stored in a memory circuit within system controller 48a (which may be substantially identical to memory circuit 156) is accessed to correlate current positions of new fish entering the system with any known behavior patterns determined through historical tracking of fish in similar conditions. The function performed in step 916 is essentially identical to that performed in step 516 as described above, but on a system-wide level. At step 918, based upon a comparison of the parameters related to the new fish populations detected and the historical database, a prediction is made of the expected location and time of the new fish populations as they move through the network of facilities.

From either step 912 or step 918, control arrives at step 920 wherein fish populations which had previously entered into the system are tracked to monitor their progress. At step 922 a comparison is made between the time and position tracking of step 920 and the predictions of fish behavior made at step 918. If the comparison indicates that the fish are following predicted movement within an acceptable tolerance, control proceeds to step 926. If, on the other hand, fish movements are found to differ substantially from those predicted, the migration tendency database is updated with the new position information. Subsequently, statistical analyses may be performed to evaluate whether the historical movement database accurately reflects the general movement of fish through the system.

At step 926 information relating to movement of fish through the overall system is communicated from system controller 48b back to individual facility controllers 48a. This movement data is preferably used by individual system controller 48b to compliment the predictions made at step 518 (see discussion of FIG. 5A above) relating to movement of fish adjacent to the individual facilities. At step 528 system controller 48b preferably calculates or schedules water flow through the various facilities in order to accommodate predicted fish movement as well as power production levels of each facility and any overall water management plans. For example, system planners may prefer to pond water during certain periods of time to plan for later power production by downstream facilities. Similarly, ponding along the overall system may be scheduled to accommodate movement of significant schools of fish as they approach successive facilities in their downstream movement.

At step 930 a comparison is made between the schedule established at step 928 and a predetermined or current schedule preferably stored in a memory circuit in either system controller 48b or individual controllers 48a. If the new schedule represents a change from the existing schedule, control advances to step 932 wherein the new schedule is downloaded to individual controllers 48a to replace the existing schedules. If at step 930 the current schedule is substantially unchanged, control advances to step 934. At step 934 the system controller determines whether an interrupt command has been received and if not returns to step 906. If, on the other hand, an interrupt command has been received, system controller exits the routine at step 936.

While the foregoing description has been provided for the presently preferred embodiment of the invention, the invention is not intended to be limited to any particular arrangement, but is defined by the appended claims. Various alternative configurations of the invention may occur to those skilled in the art, and to the extent such variations fall within the scope of the claims, they are intended to form a part of the claimed invention.

What is claimed is:

1. A system for enhancing fish survivability in a hydroelectric installation having at least one power generating unit, the unit being positioned across a body of water between an upstream water source and a downstream water discharge region, the unit including a turbine supported for rotation in response to water flowing therethrough and a power generator operatively coupled to the turbine for generating electrical power through rotation of the turbine, the unit including control surfaces selectively orientable to control power generated by the unit, the system comprising:

means for correlating at least one desired position of the control surfaces with enhanced fish survivability as fish pass through the turbine;

means for detecting fish presence in the water; and means for placing the control surfaces in the at least one desired position upon detection of the presence of fish in the water to affect the flow of water passing through the turbine.

2. The system of claim 1, wherein the means for detecting is a sensor capable of generating a signal indicative of fish presence.

3. The system of claim 1, wherein the means for detecting is capable of providing fish presence information selected from a group consisting of fish location relative to the turbine, fish speed toward the turbine, and fish school density.

4. The system of claim 3, wherein the means for placing orients the control surfaces in a pre-desired position in response to a first fish presence information signal generated by the detecting means, and in the at least one desired position in response to a second fish presence information signal generated by the detecting means, the pre-desired position corresponding to an efficiency of the unit that is at least equal to an efficiency of the unit at the at least one desired position.

5. The system of claim 1 wherein the installation includes at least two units and the system further includes an optimization means capable of maximizing enhanced fish survivability and minimizing operating efficiency losses of the installation by selectively adjusting the control surfaces of the at least two units.

6. The system of claim 1, further including a weighing means to weigh a fish presence parameter more heavily relative to other control parameters of the unit.

7. The system of claim 1, wherein the means for correlating is a capable of identifying a plurality of the at least one desired position to establish a range of desired positions of the control surfaces.

8. The system of claim 1, wherein the means for correlating includes a memory circuit in which the at least one desired position is stored.

9. The system of claim 8, wherein the means for correlating includes an N-dimensional matrix.

10. The system of claim 1, wherein the means for placing includes a control circuit configured to execute a control routine to automatically position the control surfaces based upon parameters other than the presence of fish in the water, and to execute a fish control routine to place the control surfaces to the at least one desired position when fish presence is detected.

11. The system of claim 10, wherein the control circuit is configured to stop the fish control routine and resume the control routine when fish presence is no longer detected.

12. The system of claim 10, wherein the control circuit includes an appropriately programmed microprocessor.

13. The system of claim 1, further comprising means for detecting a level of dissolved gas in the water adjacent to the installation, and wherein the means for placing the control surfaces orients the control surfaces at least in part based upon the detected level of dissolved gas.

14. The system of claim 1, wherein the system further includes a means for generating a value representative of operating efficiency of the unit and comparing first operating efficiency values representative of operating efficiency of the unit when the control surfaces are oriented based at least in part on fish presence with second operating efficiency values representative of operating efficiency of the unit when the unit is controlled without regard to fish presence.

15. The system of claim 14, further including means for generating efficiency difference values representative of differences between the first and second operating efficiency values, and means for multiplying the efficiency difference values by a cost value to generate a cumulative cost value representative of economic cost of operation of the unit based at least in part on the fish presence.

16. The system of claim 1, wherein the turbine is a Kaplan turbine and the control surfaces include wicket gate and turbine blade surfaces.

17. The system of claim 1, wherein the at least one desired position permits a flow rate of water through the turbine greater than a flow rate at which the unit most efficiently converts water flow to electrical power.

18. The system of claim 1, wherein the installation further includes at least one bypass structure configured to selectively divert water carrying fish around the installation to the discharge region, the system further comprising decision means to selectively operate the bypass structure and the turbine to maximize enhanced fish survivability and power production losses of the installation.

19. In an improved power generation group having a plurality of hydroelectric facilities disposed along a body of water flowing from an upstream source and a downstream discharge region, each facility having at least one power generation unit, each at least one unit comprising a turbine positioned in the body of water, the turbine being supported for rotation under the influence of water flow therethrough, and a power generator operatively coupled to the turbine for generating electrical power through rotation with the turbine, the unit further including control surfaces selectively orientable to control power generated by the unit, the improvement comprising a system having:

means for correlating at least one desired position of the control surfaces of a given turbine of the power generation group with enhanced fish survivability as fish pass through the given turbine;

means for detecting fish presence in the water; and means for placing the control surfaces of the given turbine in the at least one desired position upon detection of the presence of fish in the water to affect the flow of water passing through the turbine.

20. The improved power generation group of claim 19, wherein the system further comprises management means to selectively place the control surfaces of the turbines of the power generating group to maximize enhanced fish survivability and power production of the power generation group.

21. The improved power generation group of claim 20, wherein the means for detecting fish presence in the water includes a plurality of sensors disposed in the body of water, and the means for placing the control surfaces includes a memory circuit for storing a predetermined set of operating parameters corresponding to desired positions of the control surfaces coupled to a control circuit, the control circuit receiving fish presence signals from the sensors, the control circuit operative to generate command signals to orient the control surfaces based at least in part upon fish presence signals.

22. The system of claim 21, wherein the control circuit is configured to command orientation of control surfaces for different units of the power generation group in different manners when fish presence is detected within a predetermined range of a given facility.

23. The system of claim 21, wherein the control circuit is configured to command orientation of the control surfaces of the at least one turbine unit in a normal operating mode when the fish presence signals do not indicate the presence of fish within a predetermined range of the facility, and in an override mode when the fish presence signals indicate the presence of fish within the range.

24. The system of claim 23, wherein in the override mode the control circuit commands orientation of the control surfaces of the at least one turbine unit to desired positions.

25. The improved power generation group of claim 19, wherein at least one of the facilities further includes at least one bypass structure configured to selectively divert water carrying fish around the at least one of the facilities to a discharge region thereof, and the system further comprises decision means to selectively operate the at least one bypass structure to maximize enhanced fish survivability and power production of the group.

26. In an improved power generation group having a plurality of facilities disposed along a body of water flowing from an upstream source and a downstream discharge region, at least one of the facilities having at least one power generation unit, each at least one unit comprising a turbine positioned in the body of water, the turbine being supported for rotation under the influence of water flow therethrough, and a power generator operatively coupled to the turbine for generating electrical power through rotation with the turbine, the unit including first control surfaces selectively orientable to control power generated by the unit, at least one of the facilities including at least one bypass structure having second control surfaces for selectively allowing fish to bypass the unit, the improvement comprising a system having:

means for detecting fish presence in the water adjacent to at least one of the facilities; and means for regulating positions of the first and the second control surfaces to affect the flow of water passing through the turbine and the bypass structure, respectively, to control passage of fish through or around at least one of the facilities based upon detection of fish presence.

27. The system of claim 26, wherein the bypass structure is a fish bypass disposed adjacent to the at least power generation unit.

28. The system of claim 26, wherein means for regulating positions is coupled to more than one facility in the group and coordinates positioning of the first and second control surfaces of the facilities based upon power production of each facility and upon fish presence.

29. The system of claim 26, further including means for detecting a level of dissolved gas in water adjacent to at least one of the facilities, and wherein the means for regulating positions the control surfaces at least in part based upon the level of dissolved gas.

30. A system for controlling a hydroelectric turbine power generating unit, the unit being positioned across a body of water between an upstream water source and a downstream water discharge, the unit including a turbine supported for rotation in response to flow through the unit and a power generator operatively coupled to the turbine for generating electrical power through rotation with the turbine, the unit further including control surfaces coupled to actuators, the actuators being operable to selectively orient the control surfaces to control water flow through the unit, the system comprising:

a plurality of sensors for detecting presence of fish in the upstream water source;

a memory circuit for storing a predetermined set of operating parameters corresponding to desired positions of the control surfaces, the desired positions of the control surfaces being selected to enhance survivability of fish entrained into and passed through the unit;

a control circuit coupled to the sensors, to the memory circuit and to the actuators, the control circuit receiving fish presence signals from the sensors indicative of the presence of fish at predetermined locations in the upstream water source, the control circuit operative to generate command signals and to apply the command signals to the actuators to orient the control surfaces based at least in part upon the desired positions and upon the fish presence signals to affect the flow of water passing through the unit; and a cost monitoring circuit configured to generate a performance value representative of operating performance of the unit and to compare first performance values for the unit during periods of time when the control surfaces are oriented based at least in part on the fish presence signals and on the desired positions with second performance values representative of operating performance for the unit if controlled without regard to fish presence signals or to the desired positions.

31. The system of claim 30, wherein the cost monitoring circuit is further configured to generate performance difference values representative of differences between the first and second operating performance values, and to multiply the performance difference values by a cost value to generate a cumulative cost value representative of economic cost of operation of the unit based at least in part on the fish presence signals and on the desired positions.

32. The system of claim 31, wherein the cost value is representative of a market value of electrical power produced by the unit.

33. The system of claim 30, wherein the performance value is representative of the operating efficiency of the turbine unit.

34. The system of claim 30, wherein the control circuit and the cost monitoring circuit at least partly comprise an appropriately programmed microprocessor.

35. A system for controlling a hydroelectric turbine power generating unit, the unit being positioned across a body of water between an upstream water source and a downstream water discharge, the unit including a turbine supported for rotation in response to flow through the unit and a power generator operatively coupled to the turbine for generating electrical power through rotation with the turbine, the unit further including control surfaces coupled to actuators, the actuators being operable to selectively orient the control surfaces to control water flow through the unit, the system comprising:

a plurality of sensors for detecting presence of fish in the upstream water source;

a memory circuit for storing a predetermined set of operating parameters corresponding to desired positions of the control surfaces, the desired positions of the control surfaces being selected to enhance survivability of fish entrained into and passed through the unit; and a control circuit coupled to the sensors, to the memory circuit and to the actuators, the control circuit receiving fish presence signals from the sensors indicative of the presence of fish at predetermined locations in the upstream water source, the control circuit operative to generate command signals and to apply the command signals to the actuators to orient the control surfaces in a normal operating mode when the fish presence signals do not indicate the presence of fish within a predetermined location with respect to the facility, and in an override mode to alter the flow of water passing through the unit when the fish presence signals indicate the presence of fish within the predetermined location with respect to the facility.

36. The system of claim 35, wherein the control circuit commands orientation of the control surfaces to the desired positions in the override mode.

37. A system for controlling a hydroelectric turbine power generating unit, the unit being positioned across a body of water between an upstream water source and a downstream water discharge, the unit including a turbine supported for rotation in response to flow through the unit and a power generator operatively coupled to the turbine for generating electrical power through rotation with the turbine, the unit further including control surfaces coupled to actuators, the actuators being operable to selectively orient the control surfaces to control water flow through the unit, the system comprising:

a plurality of sensors for detecting presence of fish in the upstream water source;

a memory circuit; and a control circuit coupled to the sensors and the memory circuit, the control circuit receiving fish presence signals from the sensors indicative of the presence and location of fish upstream of the unit, the control circuit operative to correlate the fish presence signals with at least one other operating parameter of the unit, to alter the flow of water through the unit based upon the fish presence signals, and to store values representative of the fish presence signals and the at least one other operating parameter in the memory circuit.

38. The system of claim 37, wherein the at least one other operating parameter of the unit is time.

39. The system of claim 37, wherein the control circuit is coupled to the actuators and commands orientation of the control surfaces based at least in part upon the stored values representative of the fish presence signals.

40. The system of claim 37, wherein the control circuit is configured to correlate the fish presence signals with at least one other operating parameter for the unit within at least two different ranges of locations upstream of the unit.

41. A method for enhancing fish survivability in a hydroelectric installation having at least one power generating unit, the unit being positioned across a body of water between an upstream water source and a downstream water discharge region, the unit including a turbine supported for rotation in response to water flowing therethrough and a power generator operatively coupled to the turbine for generating electrical power through rotation of the turbine, the unit including control surfaces selectively orientable to control water flow through the unit and power generated by the unit, the method comprising:

correlating at least one desired position of the control surfaces with enhanced fish survivability as fish pass through the turbine;

detecting fish presence in the water; and placing the control surfaces in the at least one desired position upon detection of the presence of fish in the water to affect the flow of water passing through the turbine and thereby enhance fish survivability.

42. The method of claim 41, wherein the hydroelectric installation includes a sensor capable of generating a signal indicative of fish presence, and the detecting step comprises sensing the presence of fish with the sensor.

43. The method of claim 42, wherein the placing step comprises orienting the control surfaces in a pre-desired position in response to a first fish presence information signal generated by the sensor, and orienting the control surfaces in the at least one desired position in response to a second fish presence information signal generated by the sensor, the pre-desired position corresponding to an efficiency of the unit that is at least equal to an efficiency of the unit at the at least one desired position.

44. The method of claim 41, wherein the hydroelectric installation includes a control circuit configured to execute a control routine, the method further comprising:

automatically positioning the control surfaces based upon parameters other than the presence of fish in the water; and executing a fish control routine to place the control surfaces to the at least one desired position when fish presence is detected.

45. The method of claim 44, further comprising stopping the fish control routine and resuming the control routine when fish presence is no longer detected.

46. The method of claim 44, wherein the installation further includes at least one bypass structure configured to selectively divert water carrying fish around the installation to the discharge region, the method further comprising selectively operating control surfaces of the bypass structure and the control surfaces of the turbine to maximize enhanced fish survivability and power production losses of the installation.

47. The method of claim 41, wherein the turbine is a Kaplan turbine and the control surfaces include wicket gate and turbine blade surfaces, and wherein the placing step includes positioning the wicket gate and turbine blade surfaces to permit a flow rate of water through the turbine that is greater than a flow rate at which the unit most efficiently converts water flow to electrical power.

* * * * *